(12) United States Patent
Schuster

(10) Patent No.: US 11,142,897 B2
(45) Date of Patent: Oct. 12, 2021

(54) INTERNAL DRAIN HAIR AND DEBRIS STRAINING ASSEMBLY

(71) Applicant: Danco, Inc., Irving, TX (US)

(72) Inventor: Michael J. Schuster, Shorewood, IL (US)

(73) Assignee: Danco, Inc., Irving, TX (US)

( * ) Notice: Subject to any disclaimer, the term of this patent is extended or adjusted under 35 U.S.C. 154(b) by 127 days.

(21) Appl. No.: 15/720,280

(22) Filed: Sep. 29, 2017

(65) Prior Publication Data
US 2018/0106025 A1    Apr. 19, 2018

Related U.S. Application Data

(60) Provisional application No. 62/401,536, filed on Sep. 29, 2016.

(51) Int. Cl.
| | |
|---|---|
| *E03C 1/262* | (2006.01) |
| *B01D 29/31* | (2006.01) |
| *B01D 35/02* | (2006.01) |
| *E03C 1/264* | (2006.01) |

(52) U.S. Cl.
CPC .............. *E03C 1/262* (2013.01); *B01D 29/31* (2013.01); *B01D 35/02* (2013.01); *E03C 1/264* (2013.01)

(58) Field of Classification Search
CPC ..... E03C 1/262; E03C 1/264; E03C 1/26–264
See application file for complete search history.

(56) References Cited

U.S. PATENT DOCUMENTS

| 6,067,669 A * | 5/2000 | Peterson | E03C 1/262 |
| | | | 4/287 |
| 6,276,000 B1 * | 8/2001 | Saman | E03C 1/262 |
| | | | 4/287 |
| 6,601,242 B1 * | 8/2003 | Rebischke | A47K 1/14 |
| | | | 4/286 |
| 2004/0073992 A1 * | 4/2004 | Saman | E03C 1/262 |
| | | | 4/287 |

(Continued)

FOREIGN PATENT DOCUMENTS

| FR | 2652734 A2 * | 4/1991 | A47K 1/14 |
| GB | 694435 A * | 7/1953 | E03C 1/264 |
| GB | 2478146 A * | 8/2011 | E03C 1/262 |

*Primary Examiner* — Jason M Greene
*Assistant Examiner* — Eric J McCullough
(74) *Attorney, Agent, or Firm* — Thomas | Horstemeyer, LLP

(57) ABSTRACT

Various embodiments for a drain debris straining assembly are described, where the drain debris straining assembly can be positioned inside a drain to collect hair and other debris. A drain debris straining assembly in accordance with an embodiment of the present application includes a basket assembly. The basket assembly includes a basket body surrounding a hollow core and at least one opening configured to filter fluid to entrap debris. The basket assembly further includes a flexible rib configured to compress against an internal diameter of a drain flange to form a seal between the basket assembly and the drain flange. The drain debris straining assembly may also include a pop-up assembly having an interference ridge sized and positioned to contact at least one inner wall of the basket assembly to retain a vertical position of the pop-up assembly relative to the basket assembly.

20 Claims, 24 Drawing Sheets

(56) References Cited

U.S. PATENT DOCUMENTS

2010/0071122 A1* 3/2010 Li .......................... E03C 1/262
4/287
2014/0007334 A1* 1/2014 Golibart .................. E03C 1/262
4/287

* cited by examiner

INTERNAL DRAIN HAIR AND DEBRIS STRAINING ASSEMBLY

CROSS-REFERENCE TO RELATED APPLICATION

This application claims the benefit of and priority to U.S. Provisional Patent Application 62/401,536, entitled "INTERNAL HAIR STRAINER," filed on Sep. 29, 2016, the contents of which are incorporated by reference in their entirety herein.

BACKGROUND

Bathtubs and showers include a tub drain flange that normally includes a factory stopper specifically designed for the tub drain flange. The factory stopper prevents water from draining when the factory stopper is closed and allows water to drain when the factory stopper is open. When the factory stopper is open, hair and other debris are allowed to enter the opening of the tub drain flange, thereby causing clogging or other drainage problems as hair and other debris accumulates in pipes or other areas of plumbing. Clearing stoppages created by an abundance of hair usually requires pouring harmful drain opening chemicals or snaking the plumbing.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
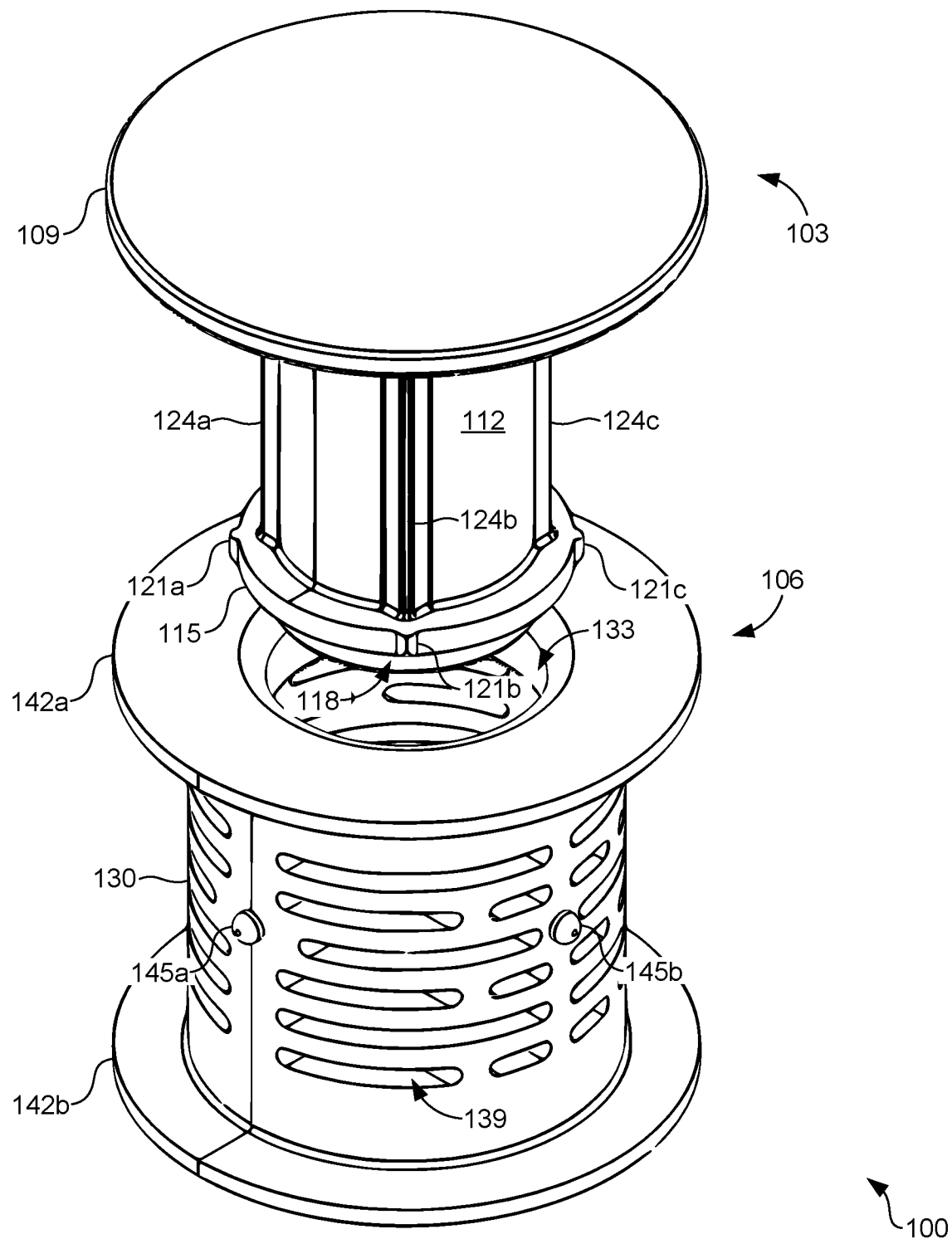
FIGS. 1, 2, 3, 4, and 5 are perspective views of a drain debris straining assembly according to various embodiments of the present disclosure.
Figure 2:
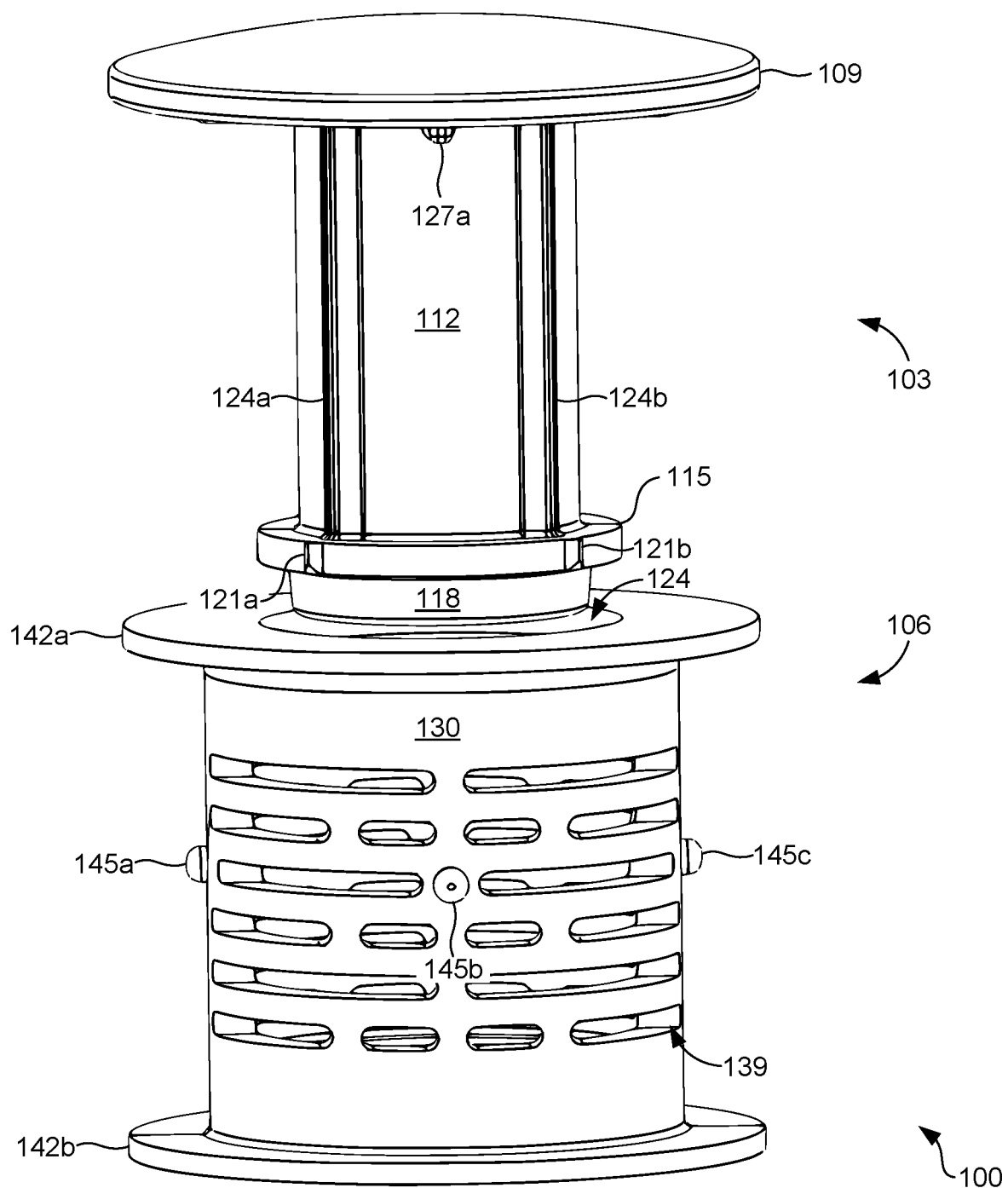
Figure 3:
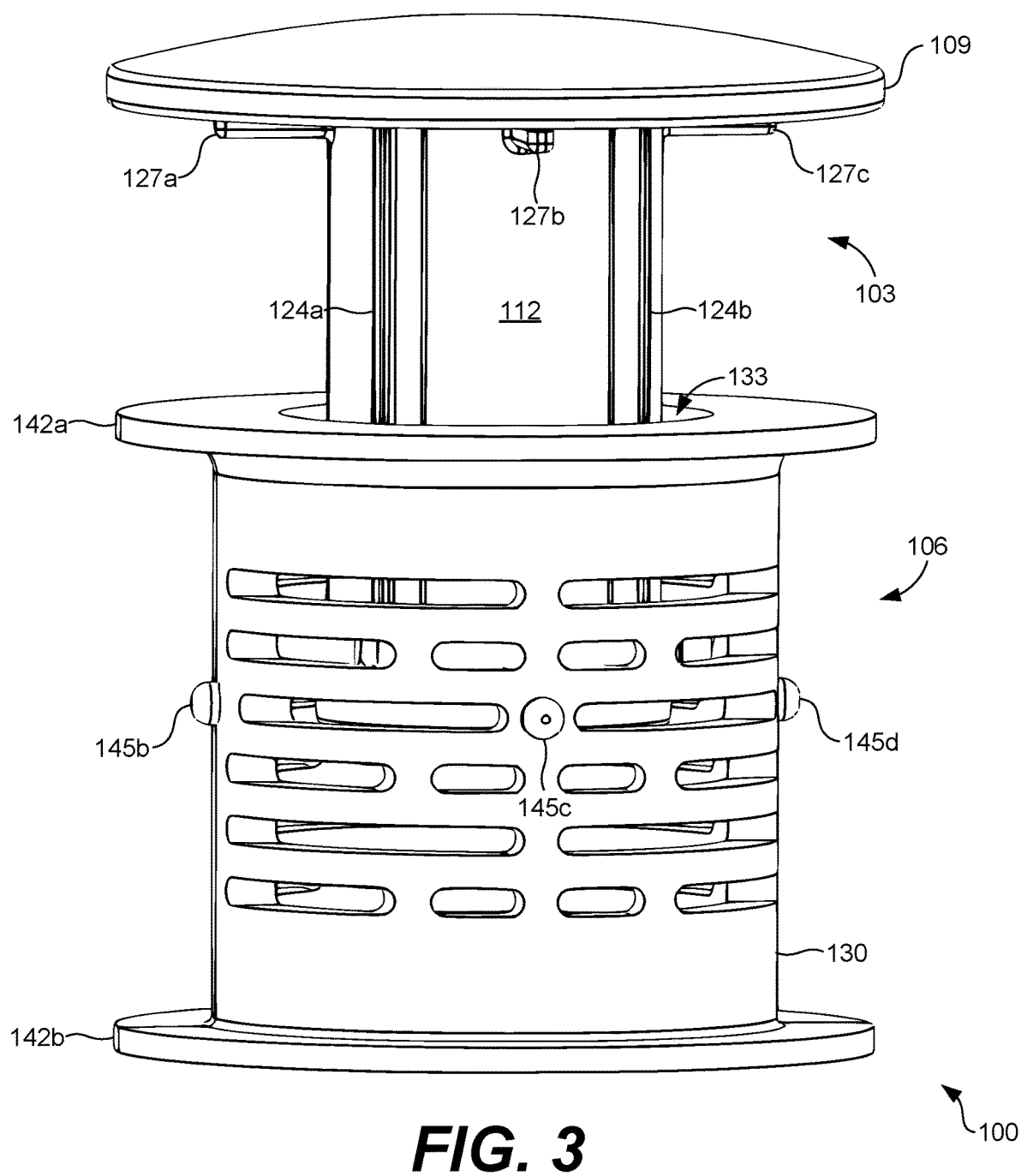
Figure 4:
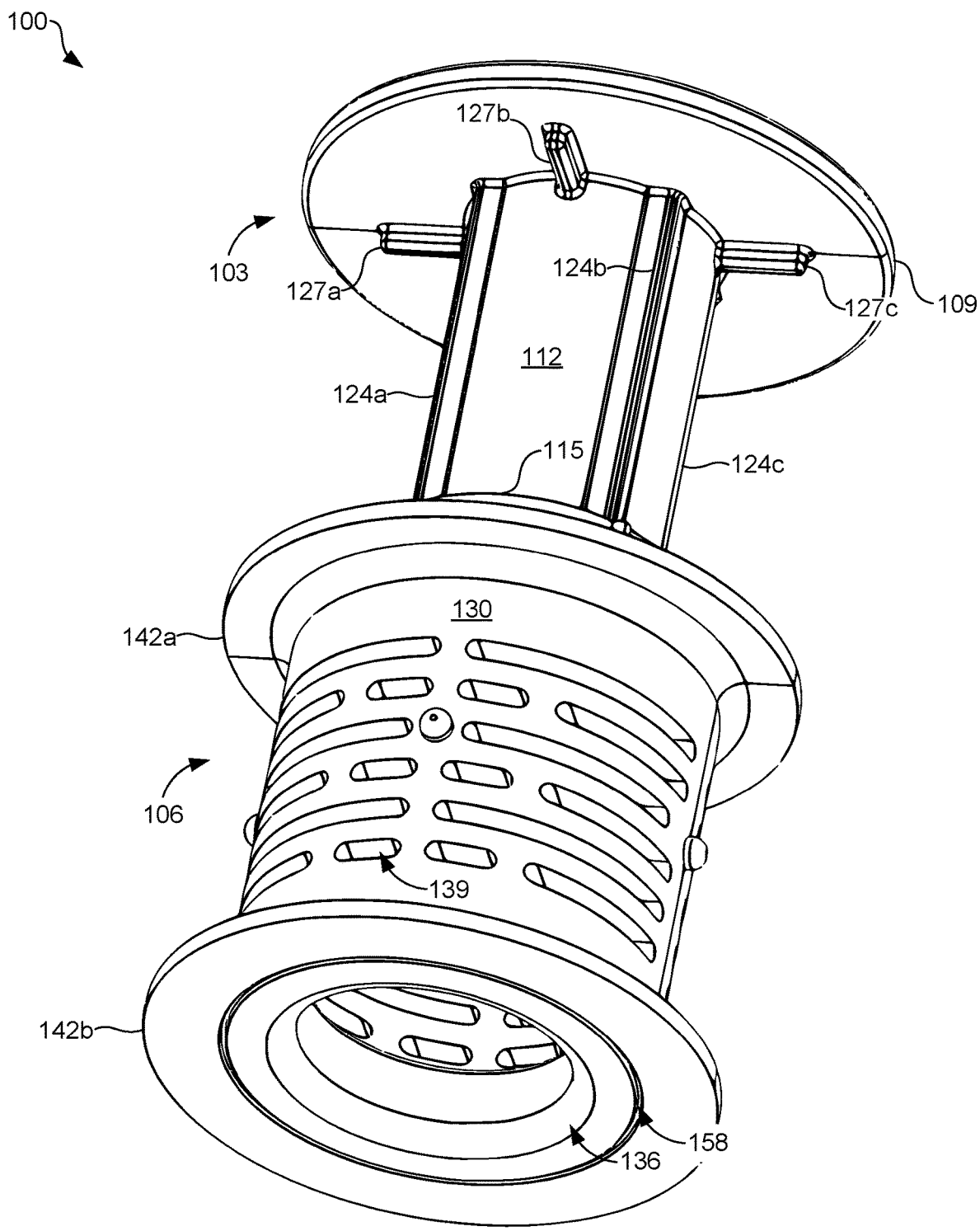
Figure 5:
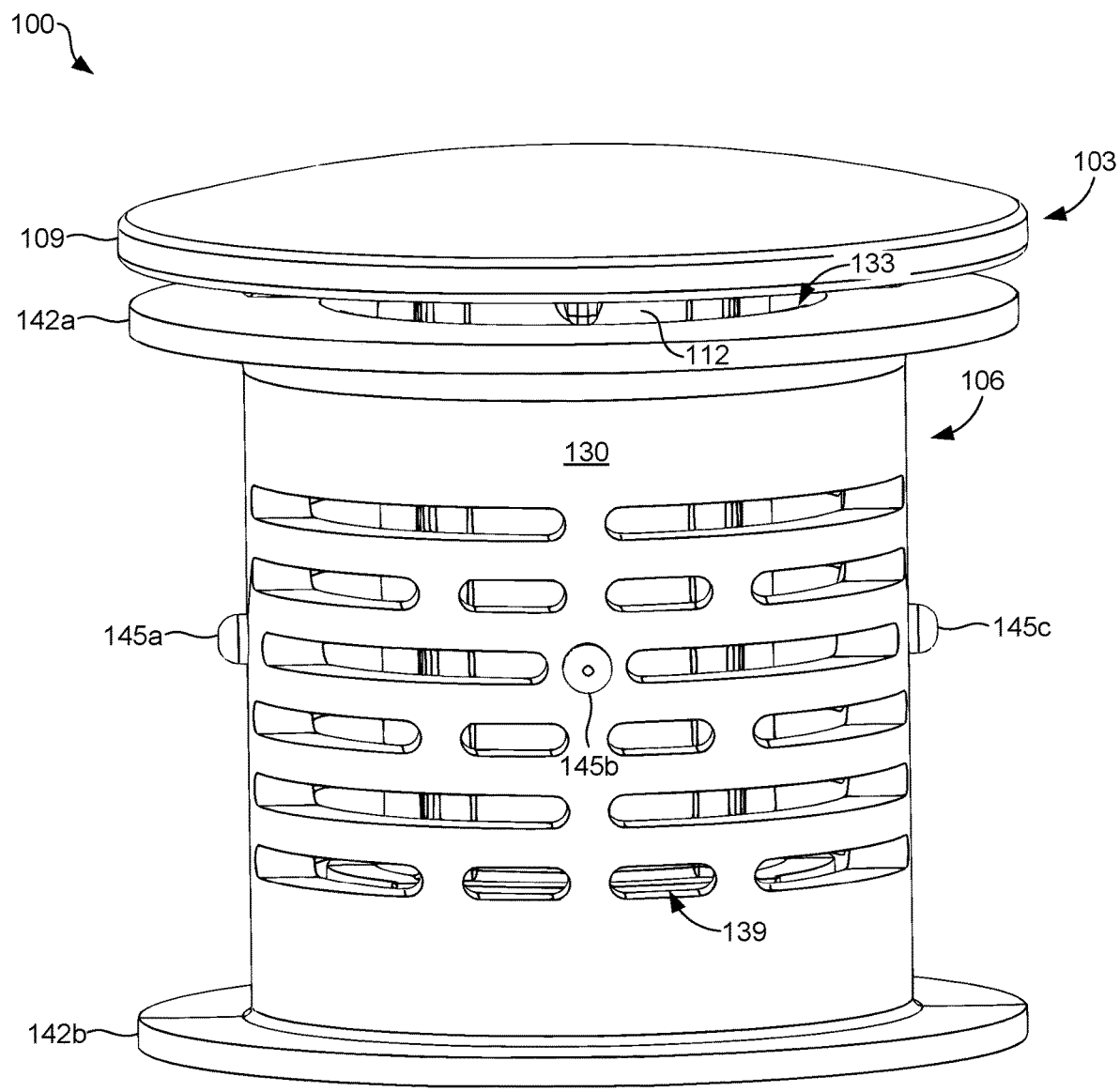
Figure 6:
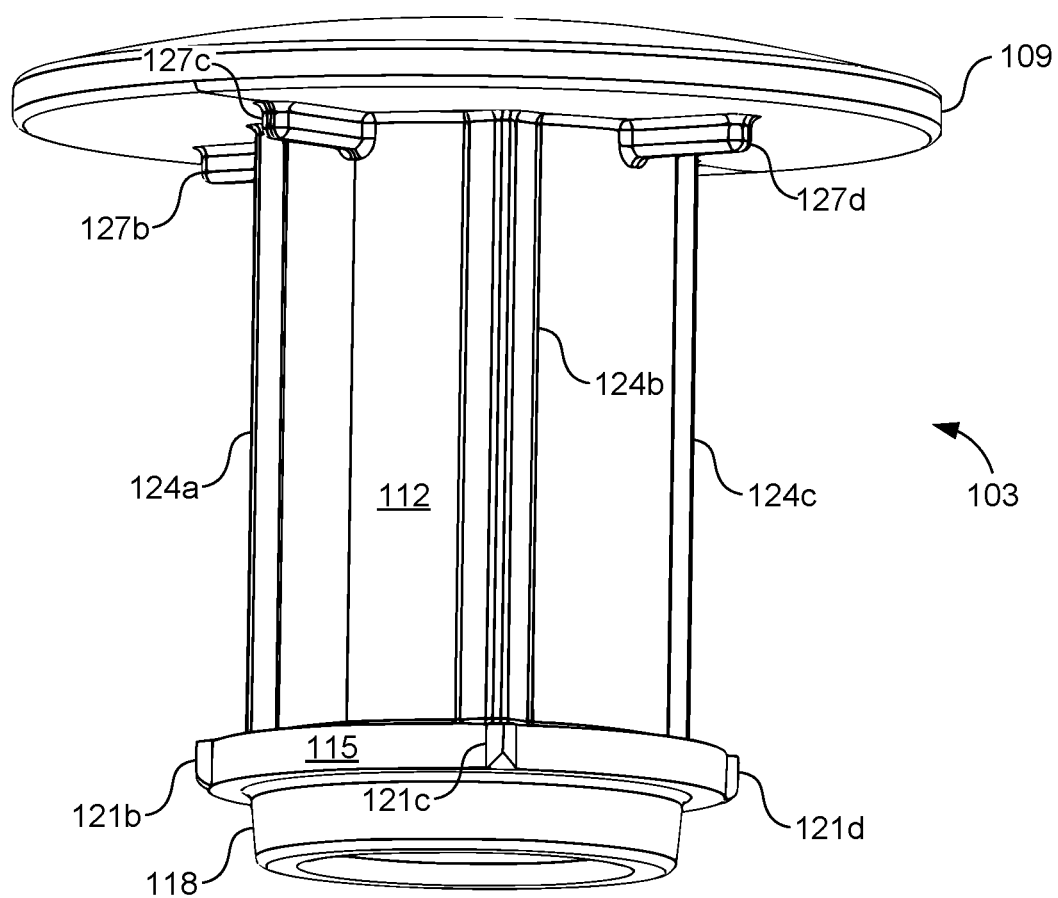
FIGS. 6, 7, 8, and 9 are perspective views of a pop-up drain stopper according to various embodiments of the present disclosure.
Figure 7:
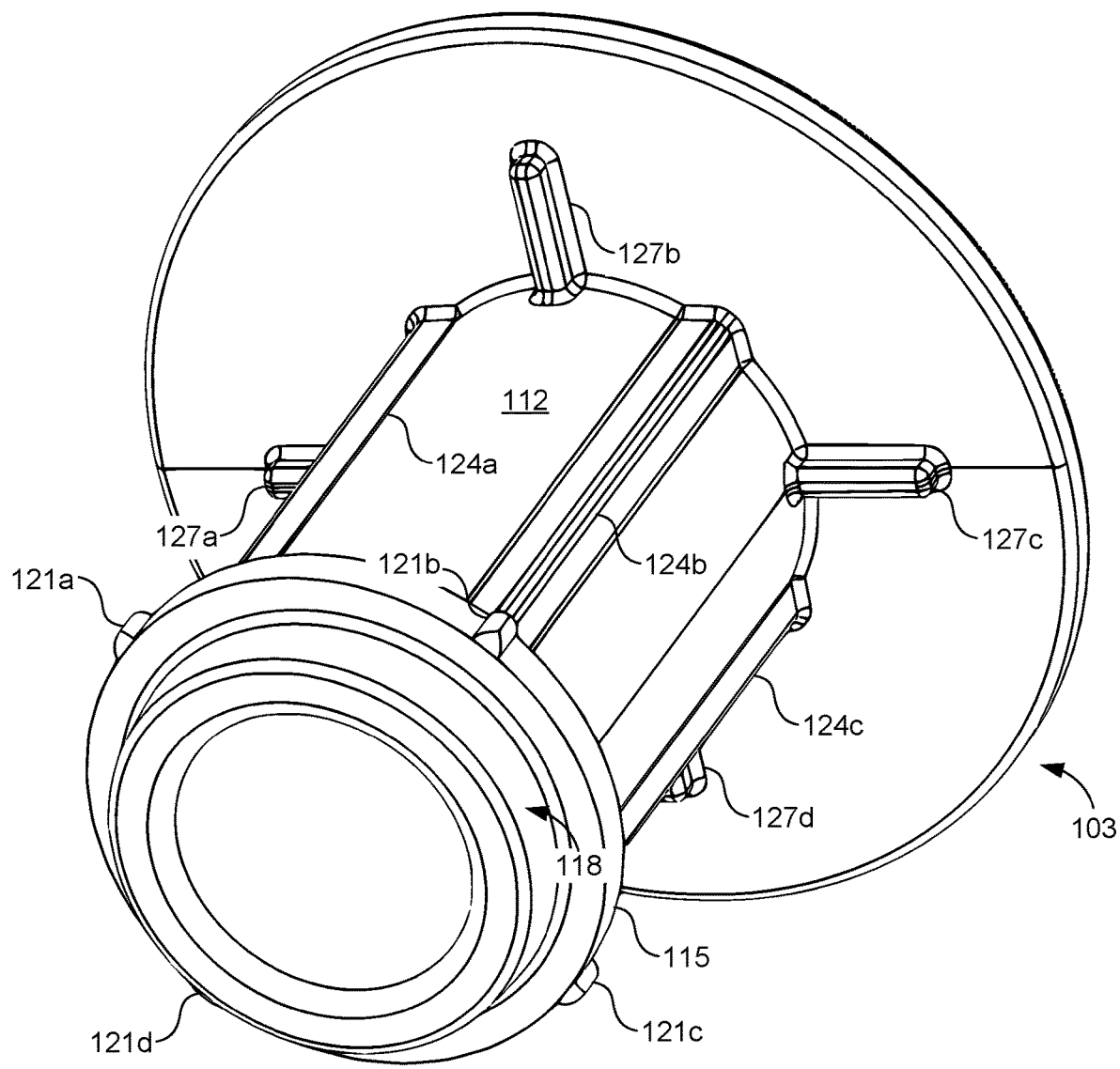
Figure 8:
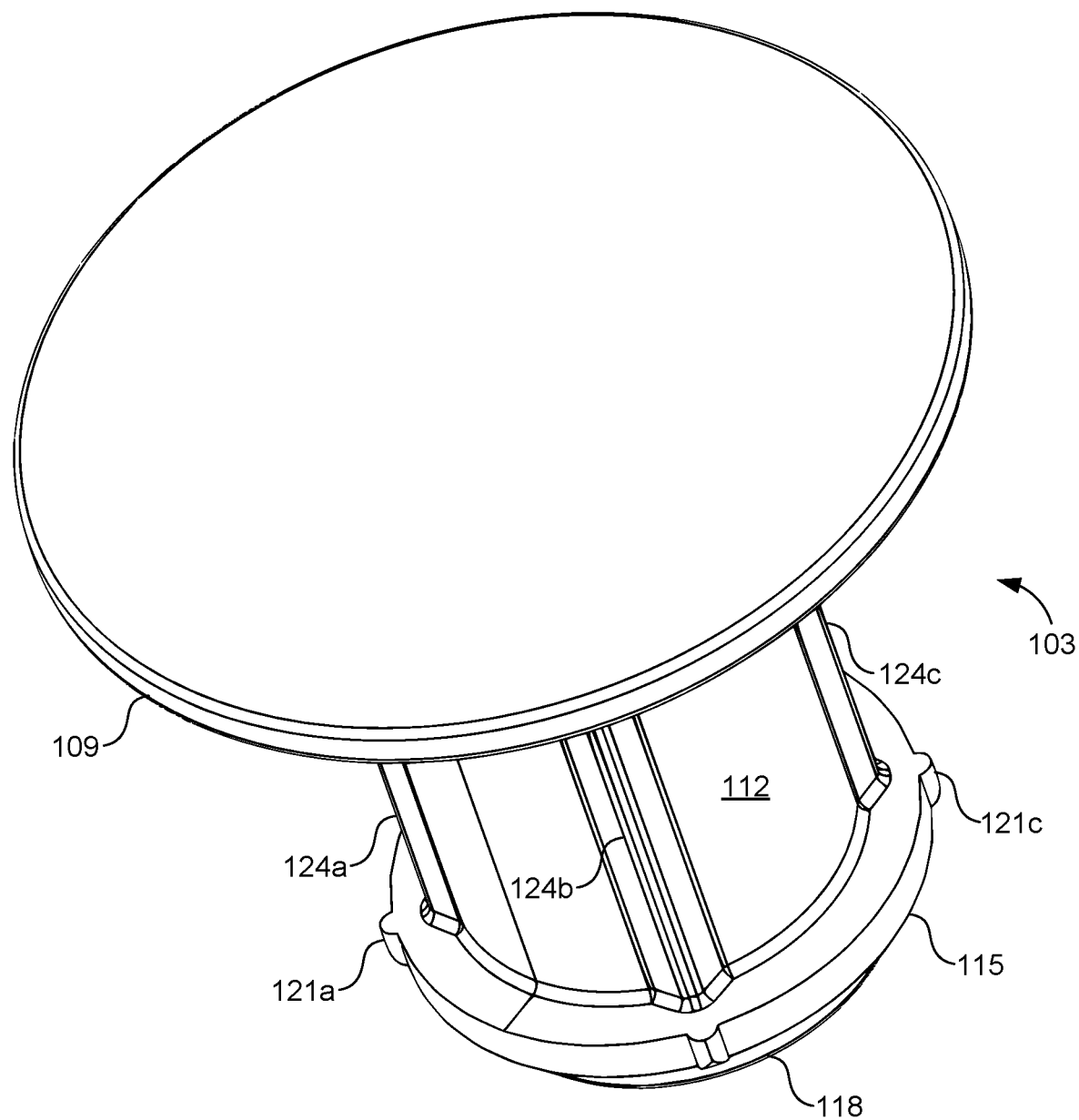
Figure 9:
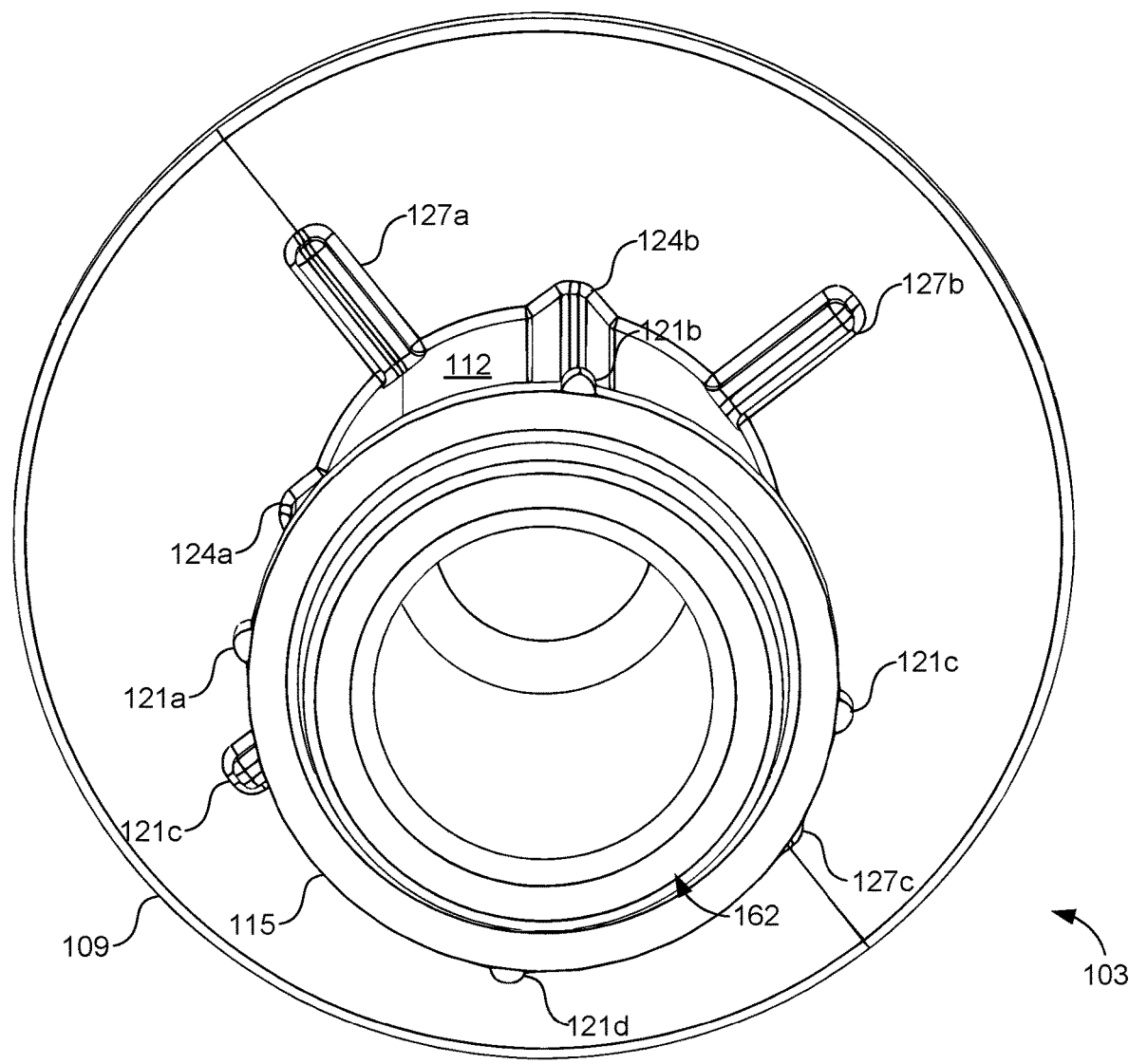
Figure 10:
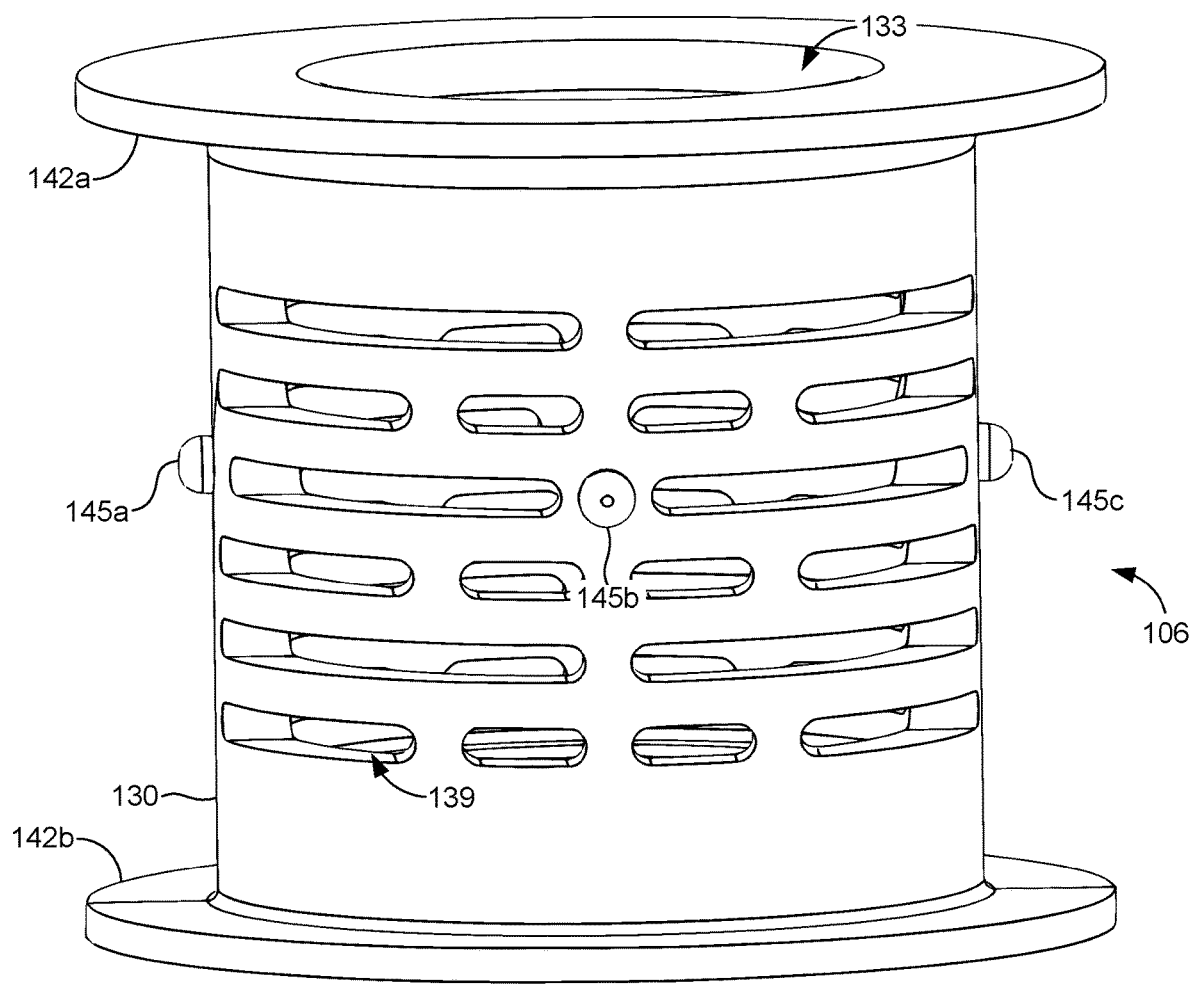
FIGS. 10, 11, and 12 are perspective views of a basket according to various embodiments of the present disclosure.
Figure 11:
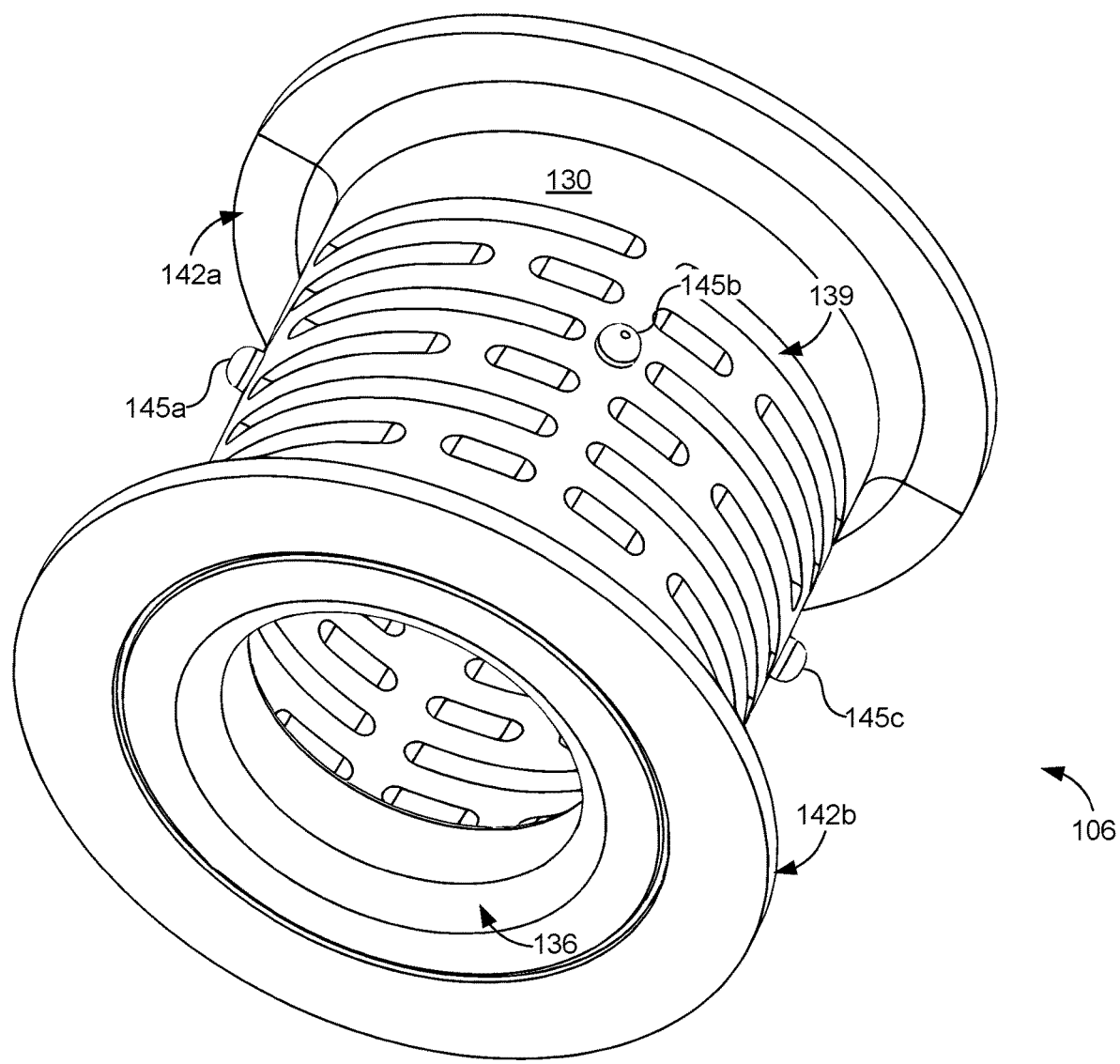
Figure 12:
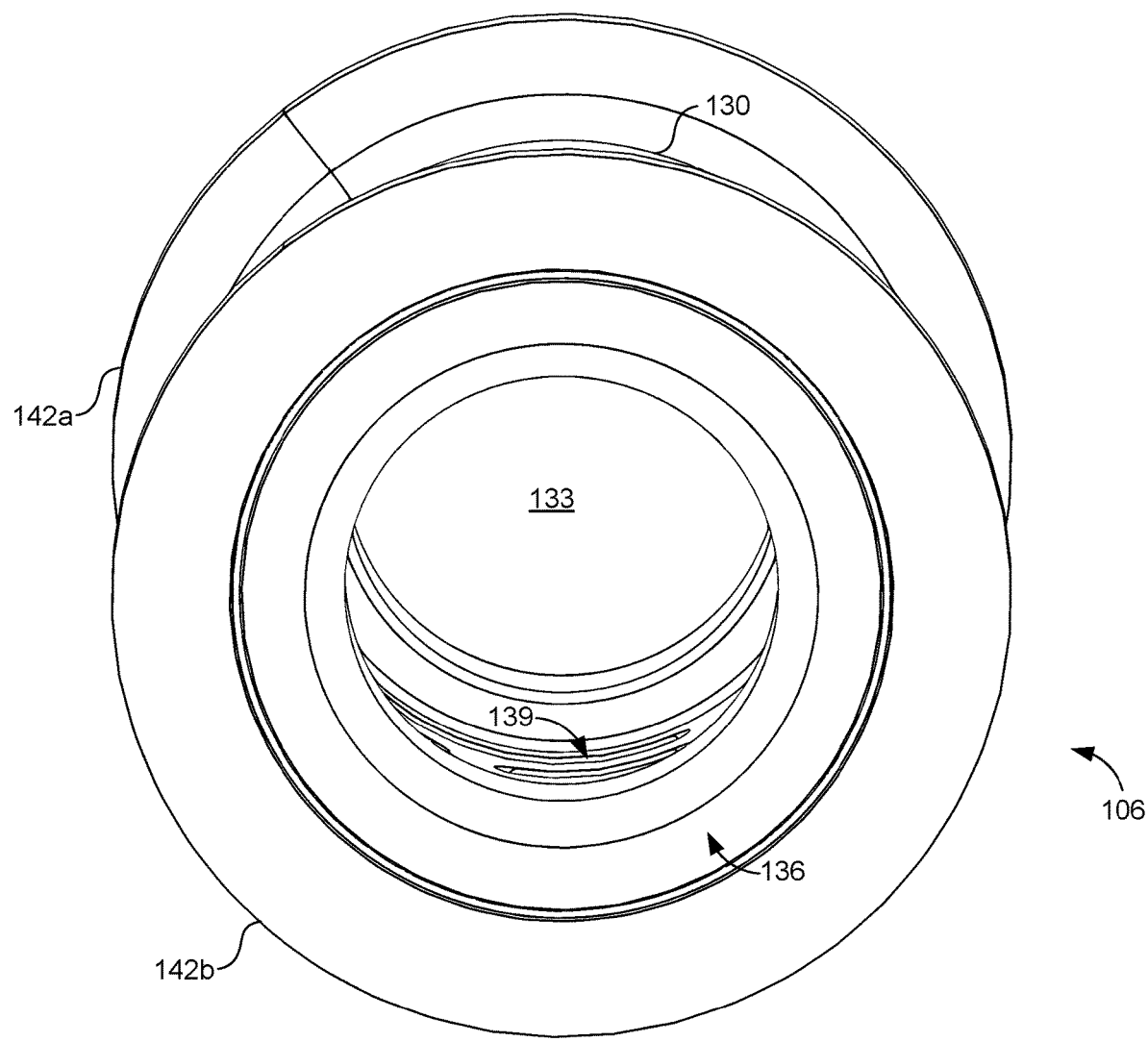
Figure 13:
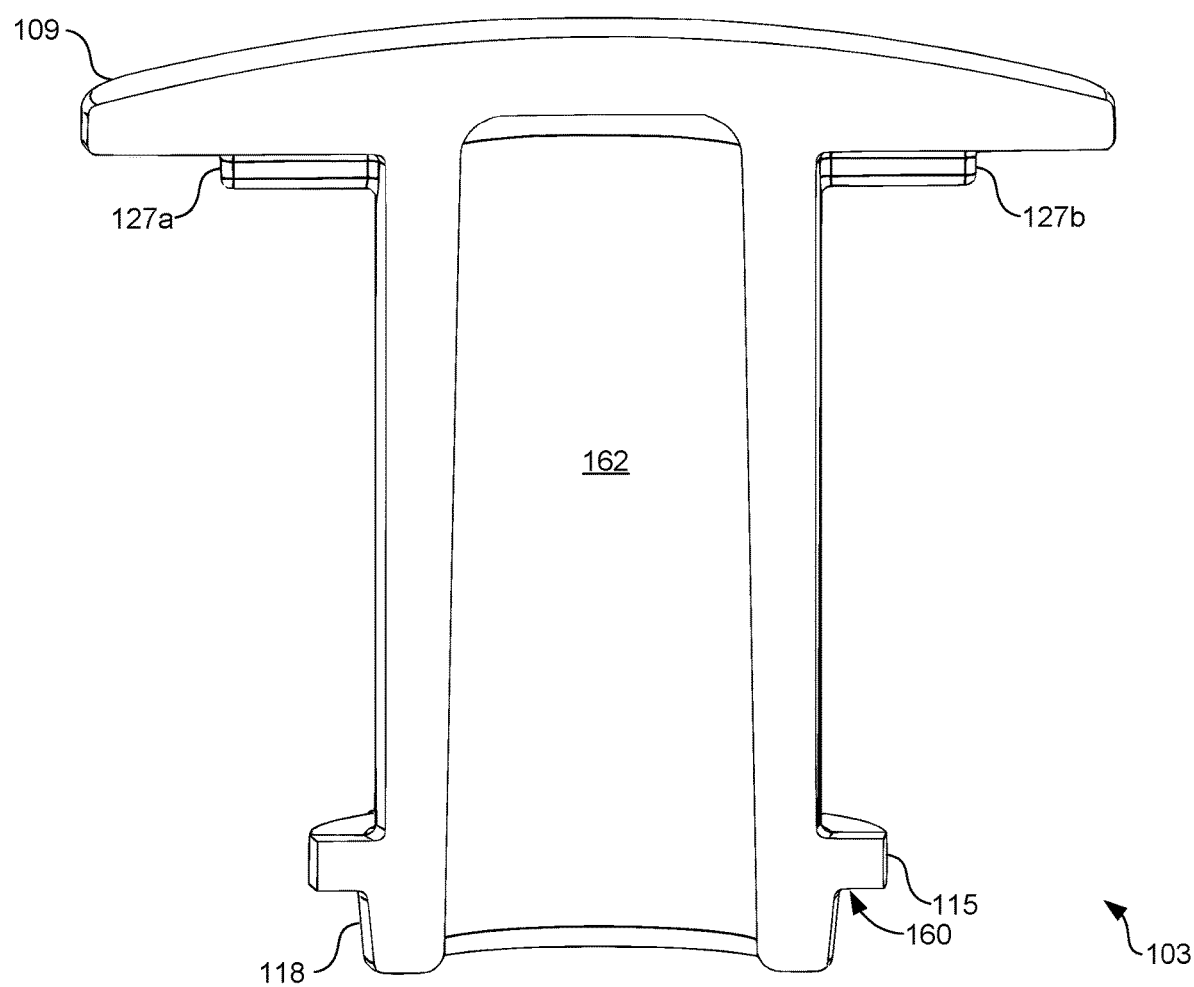
FIG. 13 is a perspective cross-section view of the pop-up drain stopper according to various embodiments of the present disclosure.

Various embodiments for a drain debris straining assembly are described, where the drain debris straining assembly can be positioned inside a drain to collect hair and other debris. A drain debris straining assembly in accordance with an embodiment of the present application includes a basket assembly. The basket assembly includes a basket body surrounding a hollow core and at least one opening configured to filter fluid to entrap debris. The basket assembly further includes a flexible rib configured to compress against an internal diameter of a drain flange to form a seal between the basket assembly and the drain flange. The drain debris straining assembly may also include a pop-up assembly having an interference ridge sized and positioned to contact at least one inner wall of the basket assembly to retain a vertical position of the pop-up assembly relative to the basket assembly.

A method of preventing hair or other debris from clogging a drain pipe in accordance with an embodiment of the present application includes inserting a basket assembly into a drain flange, where the basket assembly includes a basket body surrounding a hollow core. The basket body may include at least one opening configured to filter fluid to entrap debris using the at least one opening as well as a flexible rib configured to compress against an internal diameter of a drain flange to form a seal between the basket assembly and a drain flange. The method further includes inserting a pop-up assembly into a top aperture of the basket assembly, where the pop-up assembly comprises an interference ridge sized and positioned to contact at least one inner wall of the basket assembly to retain a vertical position of the pop-up assembly relative to the basket assembly. The method further includes adjusting the vertical position of the pop-up assembly relative to the basket assembly as well as removing the pop-up assembly from the basket body and removing hair and other debris from a reservoir formed by the basket assembly.

Other features and advantages of the present invention will become apparent from the following description of the invention which refers to the accompanying drawings.

Various perspective views of a drain debris straining assembly 100 are shown in accordance with an embodiment of the present disclosure in FIGS. 1-5, for example. The drain debris straining assembly 100 may be configured to strain water or other fluids draining from a fluid basin to collect debris, such as hair, before the debris is able to pass into any plumbing, as will be described. According to various embodiments, the drain debris straining assembly 100 may include a pop-up assembly 103 and a basket assembly 106. The pop-up assembly 103 may be configured to extend from and into the hollow core of the basket assembly 106 and form a water-tight seal with a fluid basin when the pop-up assembly 103 is moved from an open position to a closed position. According to various embodiments, the fluid basin may include a bath tub, a shower, a sink, or similar component. Additional perspective views of the pop-up assembly 103 and the basket assembly 106 are shown in FIGS. 6-9 and FIGS. 10-12, respectively. Various perspective cross-section views of the pop-up assembly 103 and the basket assembly 106 are shown in FIGS. 13-16.

Referring first to the pop-up assembly 103, the pop-up assembly 103 may include, for example, a pop-up head 109, a pop-up body 112, an interference ridge 115, and a pop-up base 118. The pop-up head 109 may be substantially disk shaped and mounted to a top distal end of the pop-up body 112. The pop-up head 109 may be formed of various materials, such as stainless steel, plastic, rubber, or other appropriate material, and may be coated or otherwise formed to have a common bathroom aesthetic, such as stainless steel, chrome, brushed nickel, or other material, as will be discussed. In some embodiments, the pop-up body 112 is substantially circular, although other shapes may be employed. The pop-up body 112 includes a substantially vertical body that extends downward to the interference ridge 115.

The interference ridge 115 of the pop-up assembly 103 may include a circular edge projecting radially from the pop-up body 112 and may include a diameter similar other otherwise substantially conforming to an internal diameter of the basket assembly 106, thereby creating a friction fit or an interference fit with inner walls of the basket assembly 106. In various embodiments, the interference ridge 115 may include a plurality of projections 121a . . . 121d (collectively "projections 121") that project radially from the interference ridge 115. The projections 121 may be semi-circular or triangular or other shape to decrease the surface area of the interference ridge 115 that actually comes into contact with the inner walls of the basket body 130, for instance, to decrease friction with the inner walls of the basket assembly 106 and make the pop-up assembly 103 easier to tug or pull (e.g., to open or close the drain). By virtue of the diameter of the interference ridge 115 (with or without the projections 121) relative to the internal diameter of the basket assembly 106, the interference ridge 115 may create an interference fit with the inner walls of the basket assembly 106. Additionally, the projections 121 may provide a slight interference fit to help retain a vertical position of the pop-up assembly 103 relative to the basket assembly 106. In alternative embodiments, the interference ridge 115 may not include any projections 121, as a frictional fit may be formed between the inner walls of the basket assembly 106 or using detents on the pop-up assembly 103 that assist the pop-up assembly 103 in retaining its position relative to the basket assembly 106 ribs may provide interference also if protruding from the inside diameter of the basket assembly 106. In any case, the interference ridge 115 and the interior of the basket assembly 106 may be formed of a size and a position to create enough friction such that the pop-up assembly 103 retains its position unless pushed or pulled by an operator.

Positioned below the pop-up body 112 is the pop-up base 118. The pop-up base 118 may have a diameter less than the interference ridge 115 and/or less than a diameter of the top aperture 133 and, in some embodiments, may taper downwards from the pop-up body 112. By virtue of the size of the pop-up base 118, the pop-up base 118 facilitates aligning a bottom portion of the pop-up assembly 103 during installation with the basket assembly 106, for instance, before forcing the pop-up assembly 103 into the basket assembly 106. For instance, the smaller diameter of the pop-up base 118 is more easily inserted into a top aperture of the basket assembly 106 than the interference ridge 115. Thus, the pop-up base 118 can be inserted into the top aperture while the interference ridge 115 is worked and positioned through the top aperture during installation of the pop-up assembly 103.

In some embodiments, the pop-up body 112 may include a plurality of elongated fins 124a . . . 124d (collectively "elongated fins 124") that extend vertically along the pop-up body 112 and project radially from the pop-up body 112. The elongated fins 124 may form channels that guide water from a fluid basin into an interior of the basket assembly 106, for instance, when the pop-up assembly 103 is pulled to an open position. In some embodiments, the pop-up body 112 may be coupled to the pop-up head 109 by way of a plurality of support members 127a . . . 127d (collectively "support members 127") that project radially from a top distal end of the pop-up body 112.

Referring now to the basket assembly 106, the basket assembly 106 may be configured to be partially or wholly positioned in a drain or a drain flange, such as that of a bath tub, a shower, a sink, or other fluid basin. In some embodiments, when installed, an upper portion of the basket assembly 106 projects from a drain of a fluid basin, as shown in FIG. 18B. Referring back to FIGS. 1-5, the basket assembly 106 may include a basket body 130 having a top aperture 133 and a bottom aperture 136, thereby forming a hollow core surrounded by inner walls of the basket body 130. The basket body 130 may be cylindrical and may include one or more openings 139 configured to strain fluid flowing into the drain while retaining debris, such as hair, at or near the openings 139. In some embodiments, the basket assembly 106 may be substantially symmetrical to facilitate ease of installation. For instance, the basket assembly 106 may not have a directed "top" or "bottom," as either end can be positioned towards a bottom of a drain flange. The one or more openings 139 may have a shape to facilitate capturing hair or other debris. In one embodiment, the openings 139 extend horizontally along the basket body 130 to create slits, or long narrow openings, in the basket body 130. The openings 139 may further include one or more slots, holes, or any other suitable shape or design suitable to catch hair or other debris.

The basket body 130 may include a first flexible rib 142a and a second flexible rib 142b (collectively "flexible ribs 142"). Similarly to the basket body 130, the first flexible rib 142a and the second flexible rib 142b may comprise rubber, silicone, TPE, TPR, NBR, EPDM, or other similar flexible and water-impermeable material. During installation, the basket assembly 106 is pushed into a drain, causing the second flexible rib 142b to fold upwards and compress against inner walls of a drain, thereby creating an interference fit between the drain walls and the basket assembly 106. In shorter drains, a substantial amount of the second flexible rib 142b (as well as a lower portion of the basket body 130) may fold upwards. Thus, the basket body 130 may include a plurality of spacers 145a . . . 145d (collectively "spacers 145") that maintain a separation between the second flexible rib 142b and the basket body 130 when the basket assembly 106 is installed in a drain.

Figure 14:
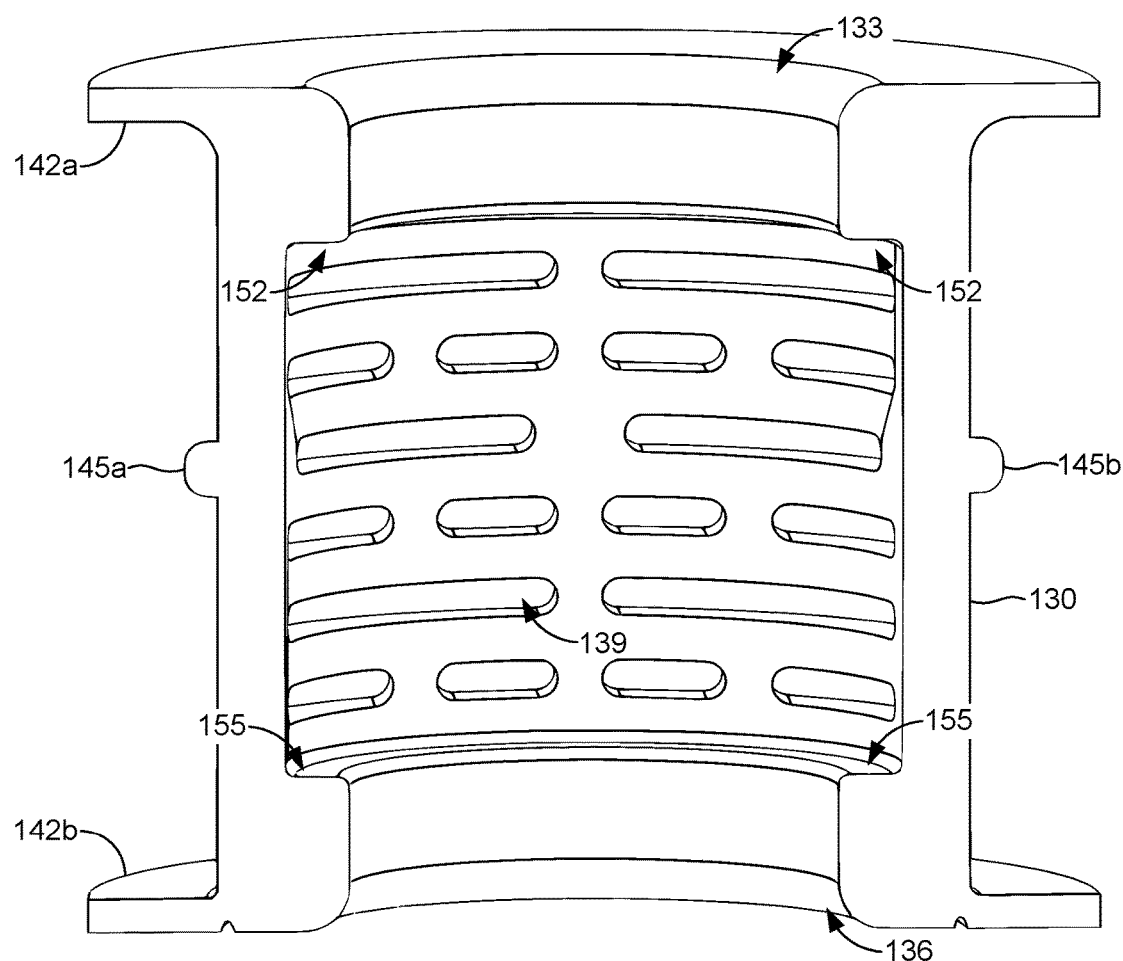
FIG. 14 is a perspective cross-section view of the basket according to various embodiments of the present disclosure.

Referring to the cross-section view of the basket assembly 106 shown in FIG. 14, the top aperture 133 and the bottom aperture 136 may have a diameter less than an interior middle portion 148 of the basket body 130. Additionally, the top aperture 133 and the bottom aperture 136 may have a diameter less than the interference ridge 115 of the pop-up assembly 103. Thus, to install the pop-up assembly 103 into the basket assembly 106, the diameter of the top aperture 133 may be increased by stretching the walls of the basket body 130 (due to the flexible material of the basket assembly 106) or the interference ridge 115 may otherwise be positioned and forced through the top aperture 133.

After the interference ridge 115 is placed into the interior middle portion 148 of the basket body 130, an upper ridge 152 and a lower ridge 155 in an interior of the basket body 130 prevents the pop-up assembly 103 from moving beyond the upper ridges 152 or the lower ridges 155. For instance, the upper ridge 152 and the lower ridge 155 are configured to contact the interference ridge 115 of the pop-up assembly 103, where the upper ridge 152 is sized and positioned to prevent an upwards movement of the pop-up assembly 103 beyond a predetermined height and the lower ridge 155 is sized and positioned to prevent a downward movement of the pop-up assembly 103 lower than a predetermined depth. The lower ridge 155 creates a sealing surface between the basket assembly 106 and a bottom surface 160 of the interference ridge 115.

Figure 15:
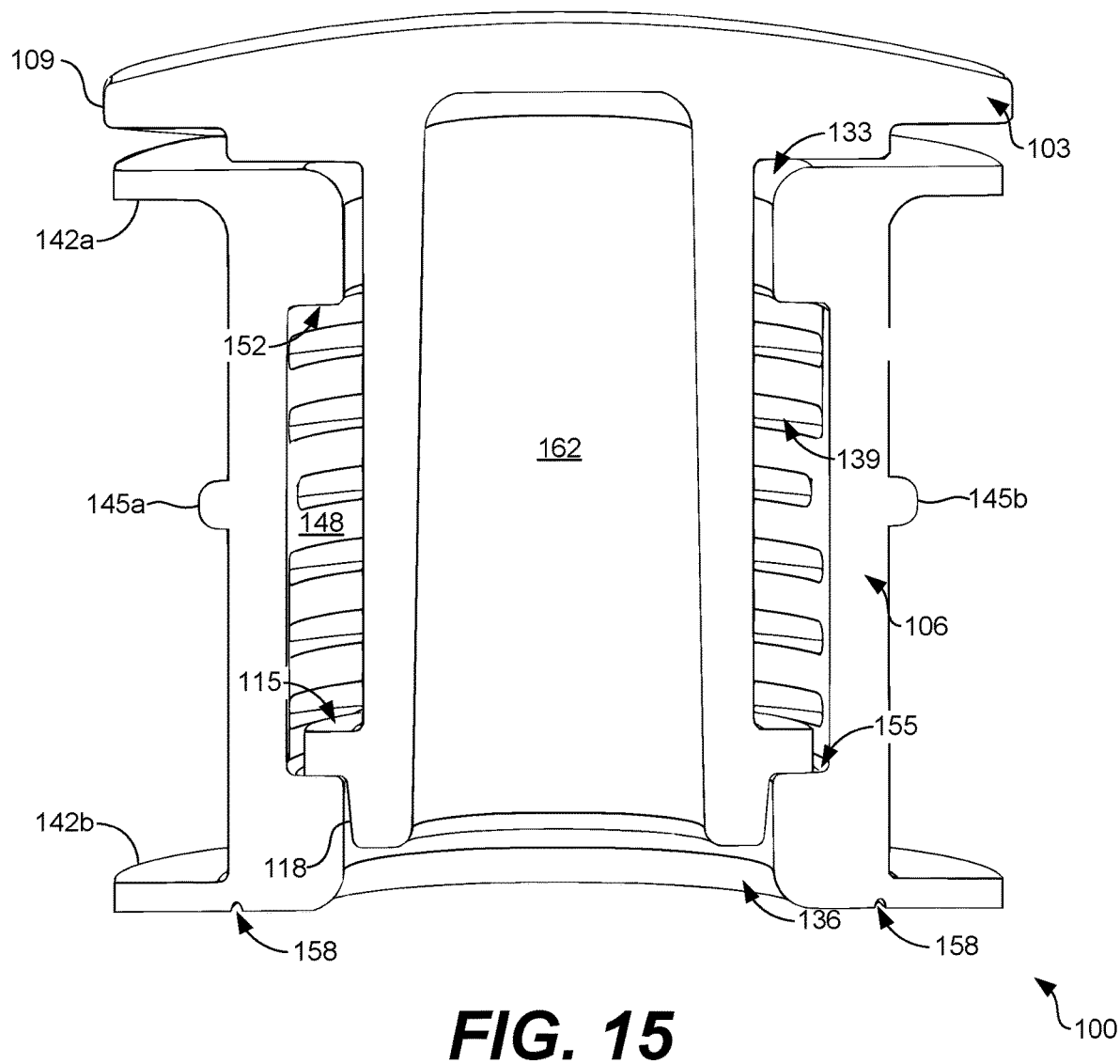
FIG. 15 is a perspective cross-section view of the pop-up drain stopper and the basket in a closed position according to various embodiments of the present disclosure.
Figure 16:
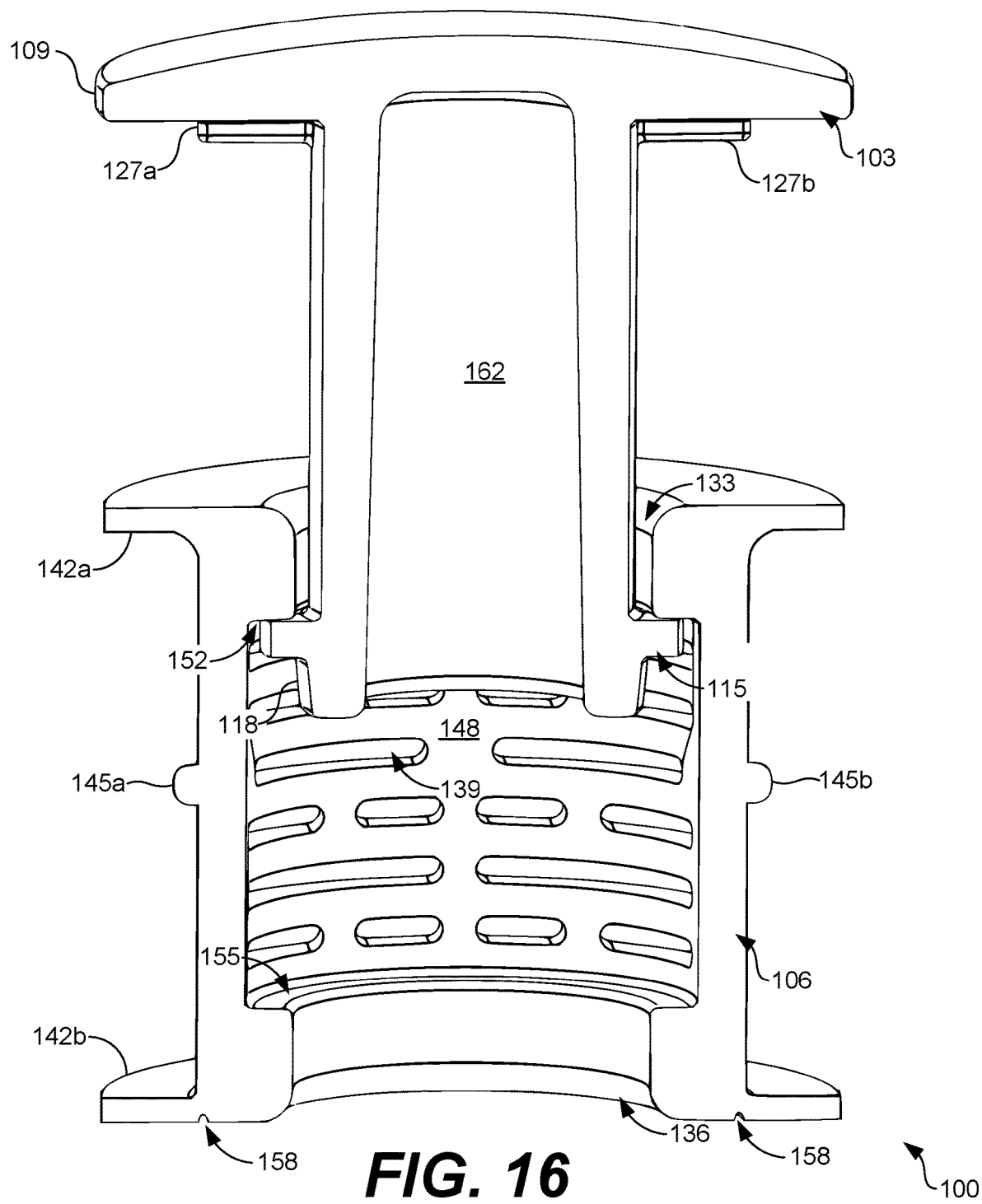
FIG. 16 is a perspective cross-section view of the pop-up drain stopper and the basket in an open position according to various embodiments of the present disclosure.
Figure 17:
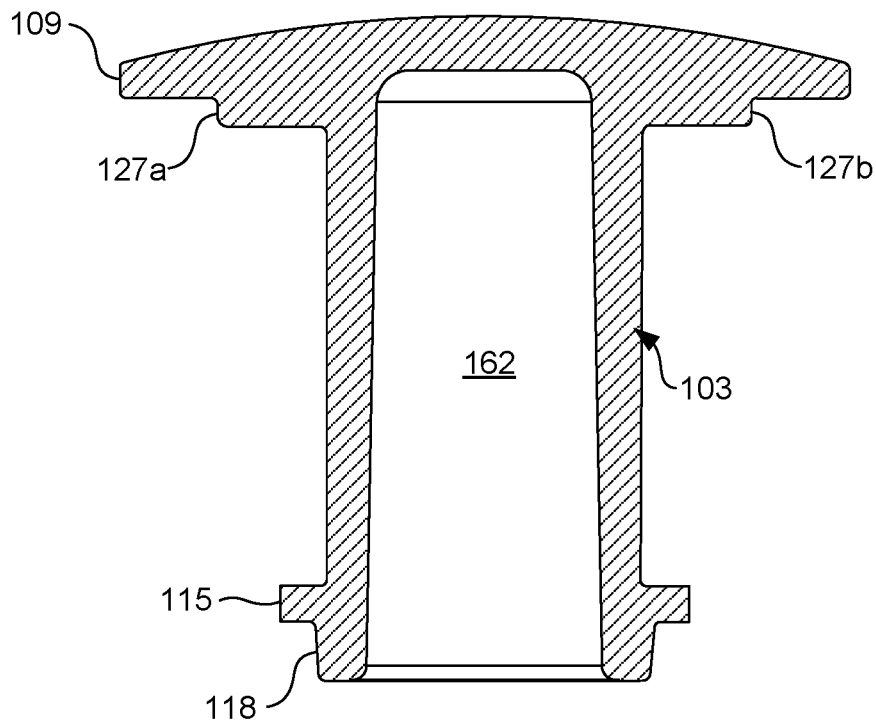
FIG. 17 is a cross-section view of the pop-up drain stopper and the basket according to various embodiments of the present disclosure.
Figure 17:
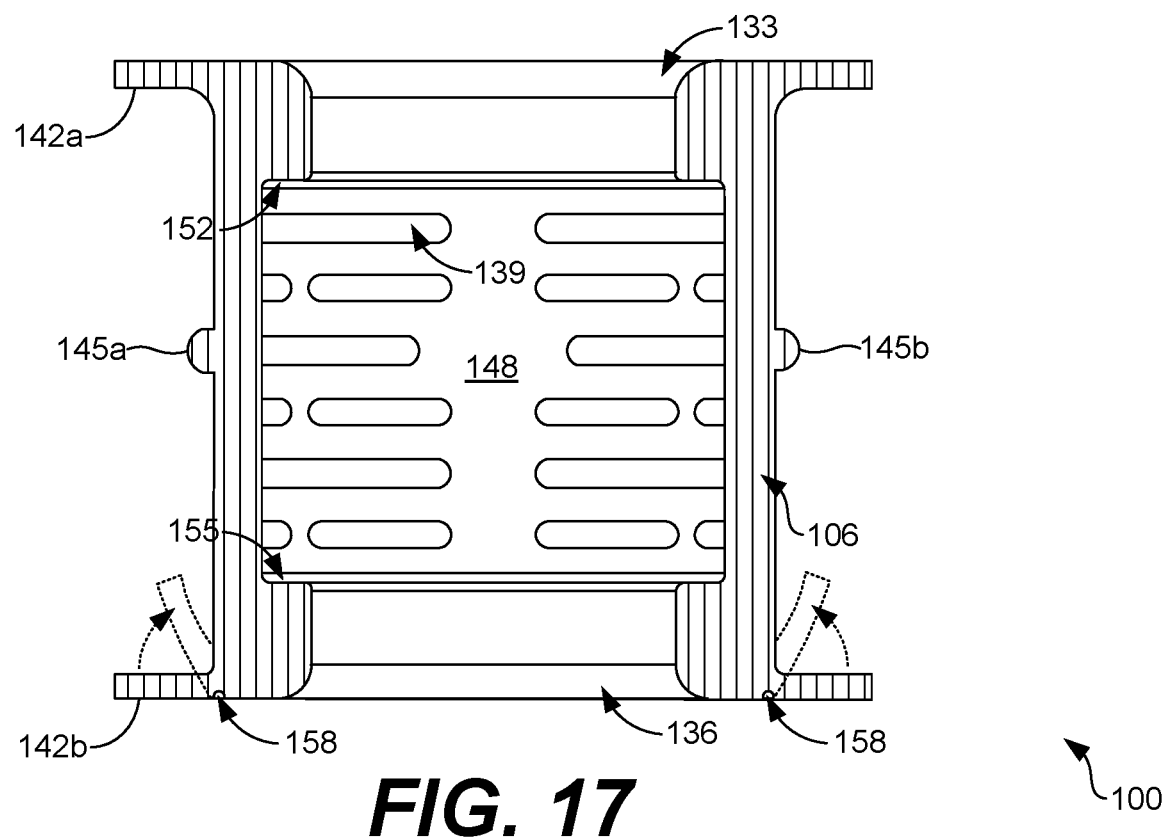

However, vertical movement or displacement of the pop-up assembly 103 is permitted by a slight tugging or pushing due to the interference fit made between inner walls of the basket body 130 and the interference ridge 115 and/or projections 121. The vertical displacement of the pop-up assembly 103 is shown in the cross-section views of FIGS. 15 and 16. Specifically, FIG. 15 shows the drain debris straining assembly 100 in a closed position, where the pop-up assembly 103 has been pushed completely downward until the interference ridge 115 comes into contact with the lower ridges 155. FIG. 16 shows the drain debris straining assembly 100 in an open position, where the pop-up assembly 103 has been pulled completely upwards until the interference ridge 115 comes into contact with the upper ridges 152. It is understood, however, that the top aperture 133 can be stretched to increase its diameter or a suitable amount of force may be applied to remove the pop-up assembly 103, for instance, to clean the basket assembly 106 of hair and other debris.

Additionally, the basket assembly 106 may include an annular groove 158 located at a bottom surface that contacts a bottom of a drain or drain flange that help maintain a shape of the basket assembly 106 when the bottom flexible rib 142b is folded (e.g., when installed in a drain). In some embodiments, the annular groove 158 is located on a single side of the basket assembly 106. Thus, the side having an annular groove 158 may be used as the bottom of the basket assembly 106 for installation in a drain having a first size or the side not having the annular groove 158 may be used as the bottom of the basket assembly 106 for installation in a drain having a second size.

In additional embodiments, a first side of the basket assembly 106 may have an annular groove 158 of a first size for installation of the basket assembly 106 in a first size of drain and the second side of the basket assembly 106 may have an annular groove 158 of a second size for installation of the basket assembly 106 in a second size of drain. In either case, the consumer may easily remove the basket assembly 106 from a tub drain flange to clean out hair and other debris from the basket assembly 106 (or replace the basket assembly 106) by applying force in a downward direction against the basket assembly 106 while simultaneously pulling the pop-up assembly 103 in an upward direction, thereby allowing the flexible material of the basket assembly 106 to bend allowing the interference ridge 115 to move past the upper ridges 152. The basket assembly 106 may also be replaceable.

Similar to the basket assembly 106, the pop-up assembly 103 may include a hollow interior 162. As will be discussed, some drains may include a factory post that projects beyond the drain. Thus, the hollow interior 162 of the pop-up assembly 103 may receive the factory post to prevent the factory post from interfering with the operation of the drain debris straining assembly 100.

Figure 18A:
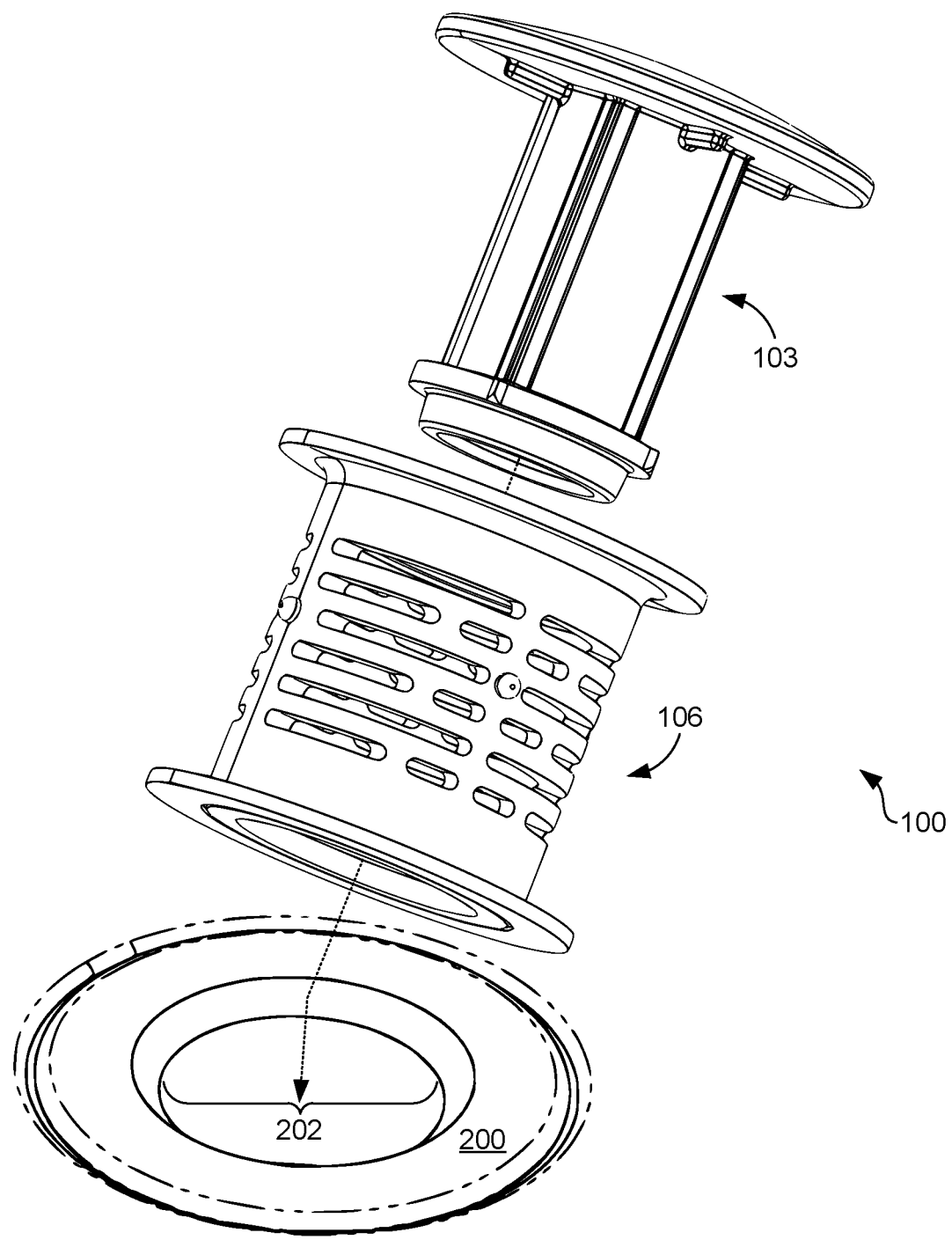
FIGS. 18A and 18B are perspective views of the drain debris straining assembly positioned relative to a drain flange according to various embodiments of the present disclosure.
Figure 18B:
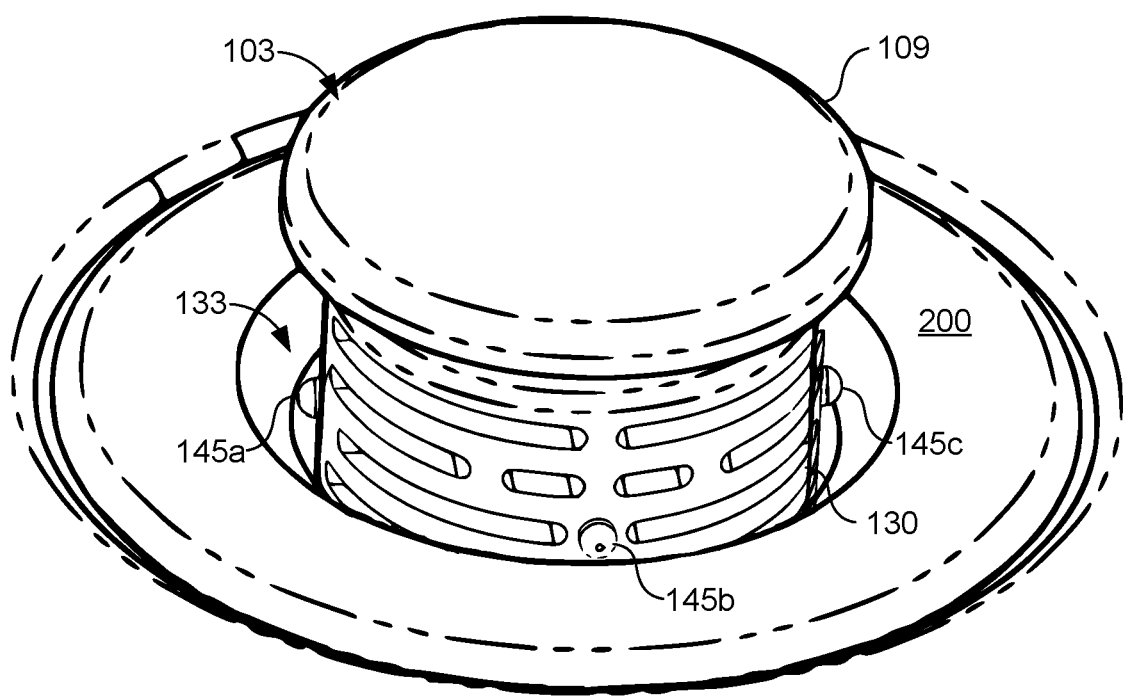

Turning now to FIG. 18A, a perspective view of the drain debris straining assembly 100 is shown along with a tub drain flange 200 having a tub flange inside diameter 202, the pop-up assembly 103, and the basket assembly 106. A bottom portion of the basket assembly 106 is compressed and forced downward into tub drain flange 200 and, thereafter, the pop-up assembly 103 is forced into the top aperture 133 of the basket assembly 106. In FIG. 18B, the drain debris straining assembly 100 is shown installed in a tub drain flange 200, where the drain debris straining assembly 100 is shown in a closed position. As shown, an upper portion of the basket assembly 106 may project from the tub drain flange 200, although in other embodiments, an entirety of the basket assembly 106 may be positioned in the tub drain flange 200.

Figure 19:
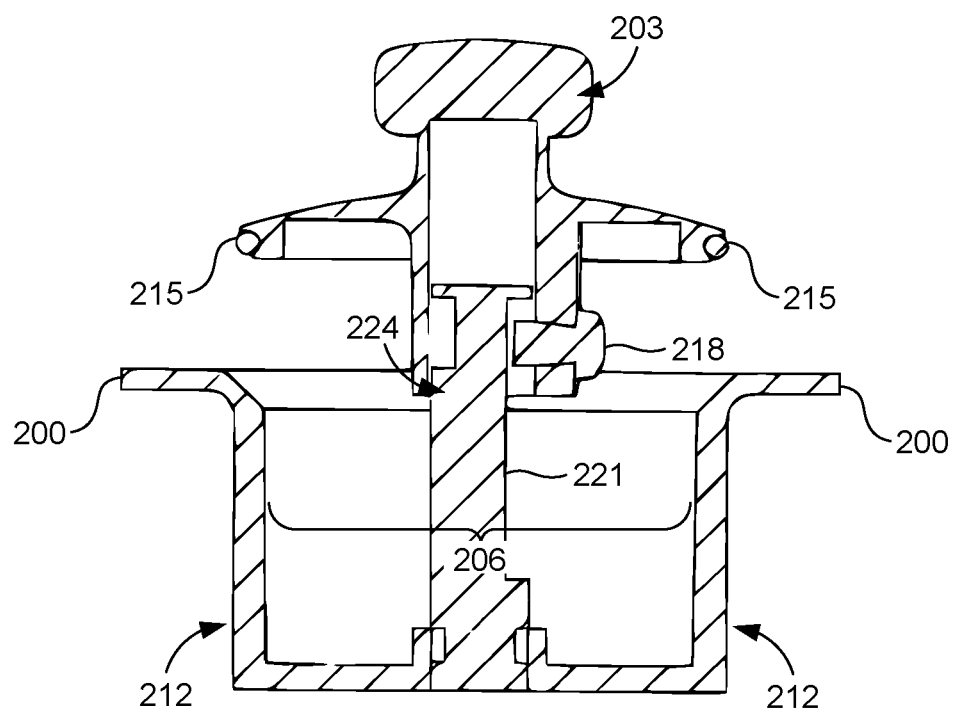
FIG. 19 is a cross-section view of a traditional drain system according to various embodiments of the present disclosure.
Figure 20:
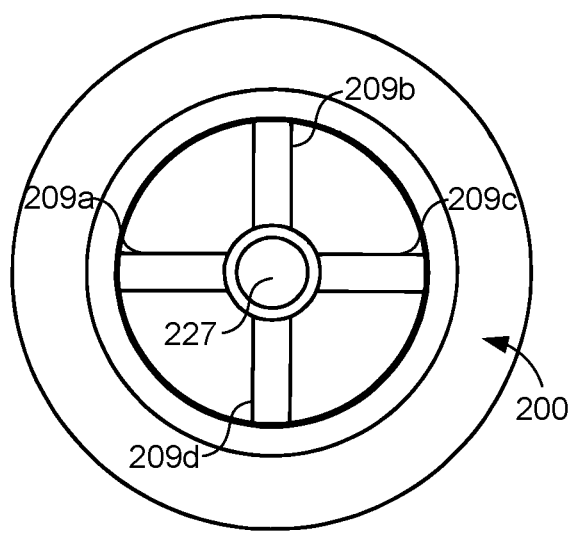
FIG. 20 is a top plan view of a traditional drain system according to various embodiments of the present disclosure.

Referring next to FIGS. 19 and 20, multiple views of a tub drain flange 200 are shown. The tub drain flange 200 normally includes a factory stopper 203 that is commonly designed and manufactured specifically for the tub drain flange 200. As may be appreciated, the factory stopper 203 prevents water from draining when the factory stopper 203 is in a closed position and allows water to drain when the factory stopper is in an open position, as shown in FIG. 16. When the factory stopper 203 is open, hair and other debris is permitted to enter the opening of the tub drain flange 200, allowing for potential tub drainage problems as the hair accumulates in drain pipes.

Once hair accumulates it must be physically removed by disassembling the tub drain assembly (not shown) or by adding harsh chemicals into the drain in an attempt to dissolve the hair. However, when the drain debris straining assembly 100 is installed in place of the factory stopper 203 in the tub drain flange 200, the drain debris straining assembly 100 can be closed to hold water in the tub or opened to drain the water from the tub. When the water in the tub is draining, the pop-up assembly 103 would be in the upward position, as shown in FIG. 16, and the water is allowed to travel through the openings 139 allowing hair and other debris to catch on the basket assembly 106. To this end, the drain debris straining assembly 100 may be used to catch hair that would normally go down the drain and clog pipes and other impair a sewage or septic system. According to various embodiments, the drain debris straining assembly 100 is universal, having the ability to fit in drain openings of different sizes. The drain debris straining assembly 100 may be easily installed and removed without tools, where the removal of the basket assembly 106 allows the basket assembly 106 to be cleaned as hair and other debris accumulates in or near the openings 139.

Referring again to FIGS. 19 and 20, the tub drain flange 200 includes the factory stopper 203, a tub flange inside diameter 206, cross-walls 209a . . . 209d (collectively "cross-walls 209"), a male threaded portion 212, a factory seal 215, a set screw 218, a factory post 221. The factory post 221 has an upper portion 224 as well as a center attachment 227. It is understood that the factory stopper 203 may be permanently installed in some fluid basins and, as such, the factory stopper 203 may be received in the hollow interior 162 of the pop-up assembly 103 and the basket assembly 106, allowing the drain debris straining assembly 100 to operate without being impaired by the presence of the factory post 221. With reference to FIG. 20, a cross-section view of the tub drain flange 200 is shown along with the tub flange inside diameter 206 and the male threaded portion 212.

Some tub drain flanges 200 include a factory post 221 that is affixed to the center attachment 227. The factory post 221 acts as a guide for the factory stopper 203 to travel in the open and closed position. The factory stopper 203 typically has a factory seal 215 that allows the tub to hold water. The cross-walls 209 at the base of the tub drain flange 200, as shown in FIG. 20, is typically the first location to catch hair. To remove the factory stopper 203, a homeowner typically needs to loosen the set screw 218 and utilize a tool to remove hair or other debris from the cross-walls 209 or the drain. However, the drain debris straining assembly 100 prevents more hair from going down the drain by allowing for easy removal of the basket assembly 106 and catch a greater percentage of debris and hair.

The basket assembly 106, or portions thereof, may be formed using at least one silicone, thermoplastic elastomer (TPE), thermoplastic rubber (TPR), ethylene propylene diene monomer (EPDM) rubber, nitrile rubber (NBR), or other suitable materials. The basket assembly 106, or portions thereof, may also be formed using at least one plastic material, such as polypropylene (PP), acrylonitrile-butadiene-styrene (ABS), polyvinyl chloride (PVC), polyoxymethylene (POM), linear low-density polyethylene (LLDPE), or other suitable materials. In some embodiments, the basket assembly 106 may include metal materials, such as brass, copper, zinc, or other plastic or metal material. As can be appreciated, the basket assembly 106 may be formed using an overmold (or injection molding) in the portions that may require a flexible material, such as the flexible ribs 142 or material surrounding the top aperture 133 that allows the pop-up assembly 103 to travel inside the basket assembly 106.

The pop-up assembly 103 may include or be formed from at least one plastic material, such as ABS, polycarbonate-ABS (PC/ABS), polyetherimide (PEI), polyphthalamide (PPA), polystyrene, liquid crystal polymer (LCP), noryl, xylex, xenoy, urethane, nylon, polyether ether ketone (PEEK), polyphenylene sulfide (PPS), PPS PP, POM, PVC, chlorinated PVC (CPVC), or other plastic materials. The pop-up assembly 103, or portion hereof (e.g., the pop-up head 109), may include a finish that matches existing tub drain flanges 200 and, as such, may be produced in a semi-clear or clear color, or using materials such as brass, zinc, copper, steel, stainless steel, or other metal materials as may be appreciated. The pop-up assembly 103, or portion thereof, may also include rubber materials like silicone, EPDM, or other suitable materials in multiple colors and finishes known in the industry.

Figure 21A:
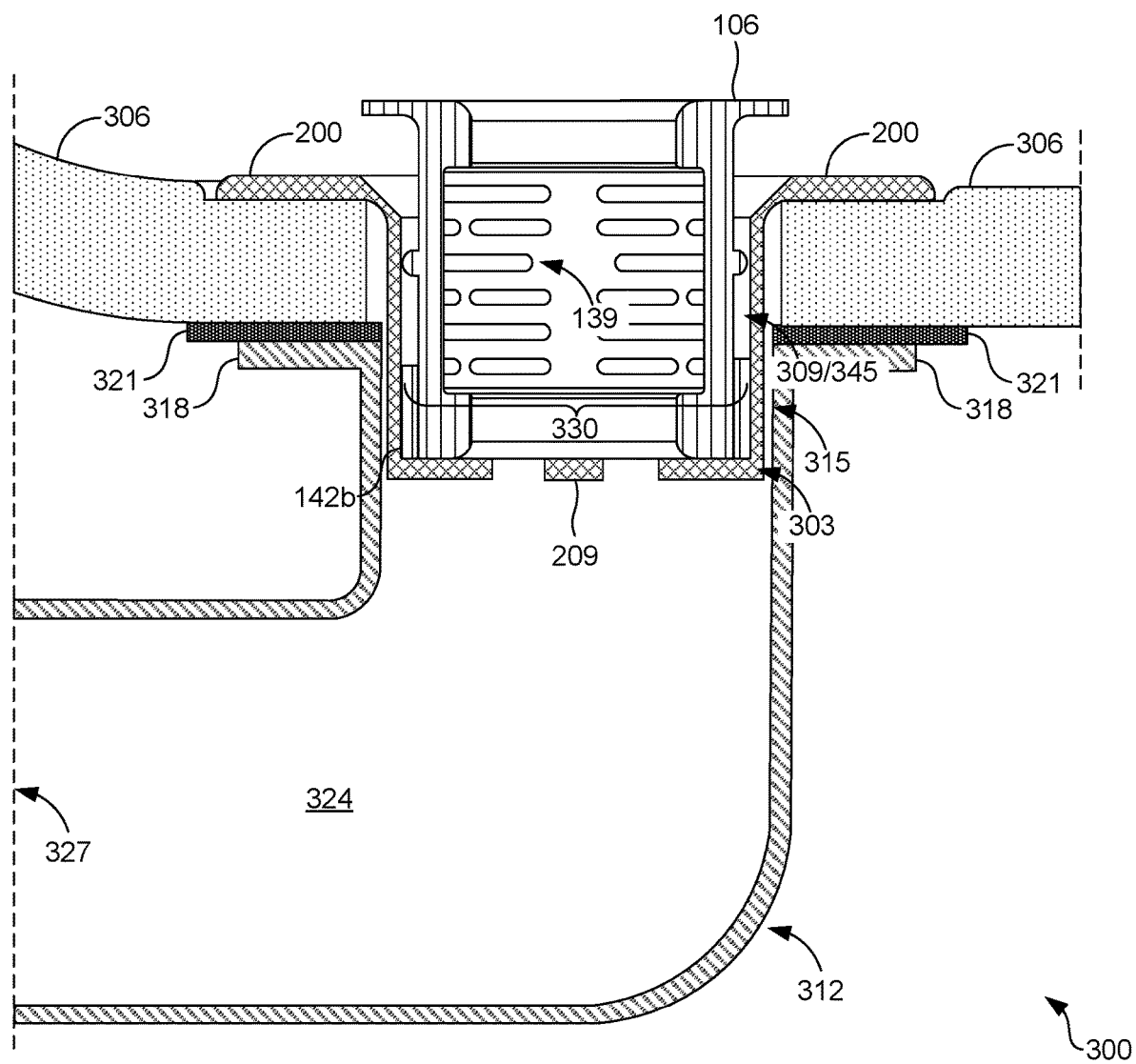
FIGS. 21A, 21B, 21C, and 21D are cross-section views of the drain debris straining assembly shown relative to a drain assembly according to various embodiments of the present disclosure.
Figure 21B:
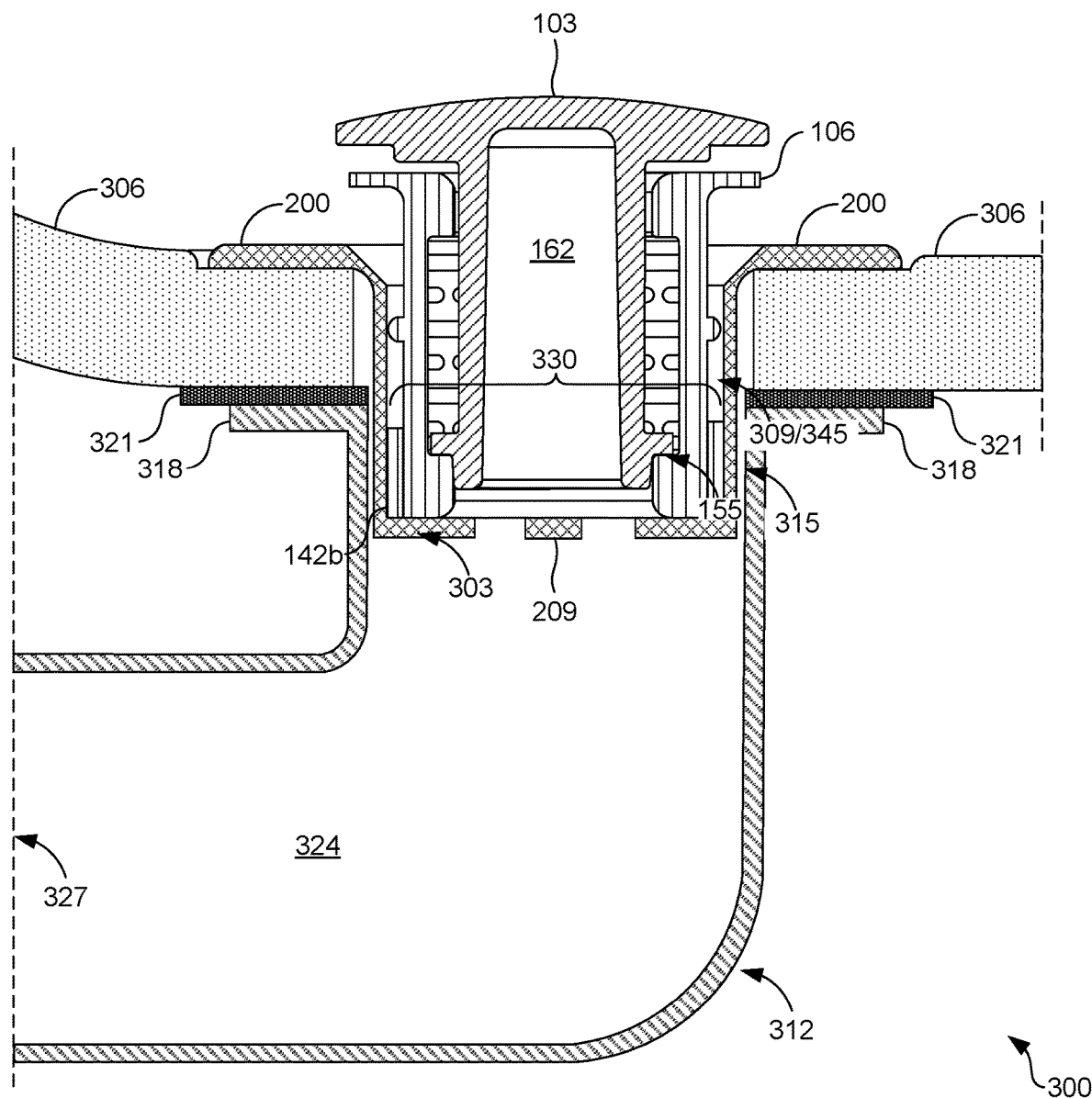
Figure 21C:
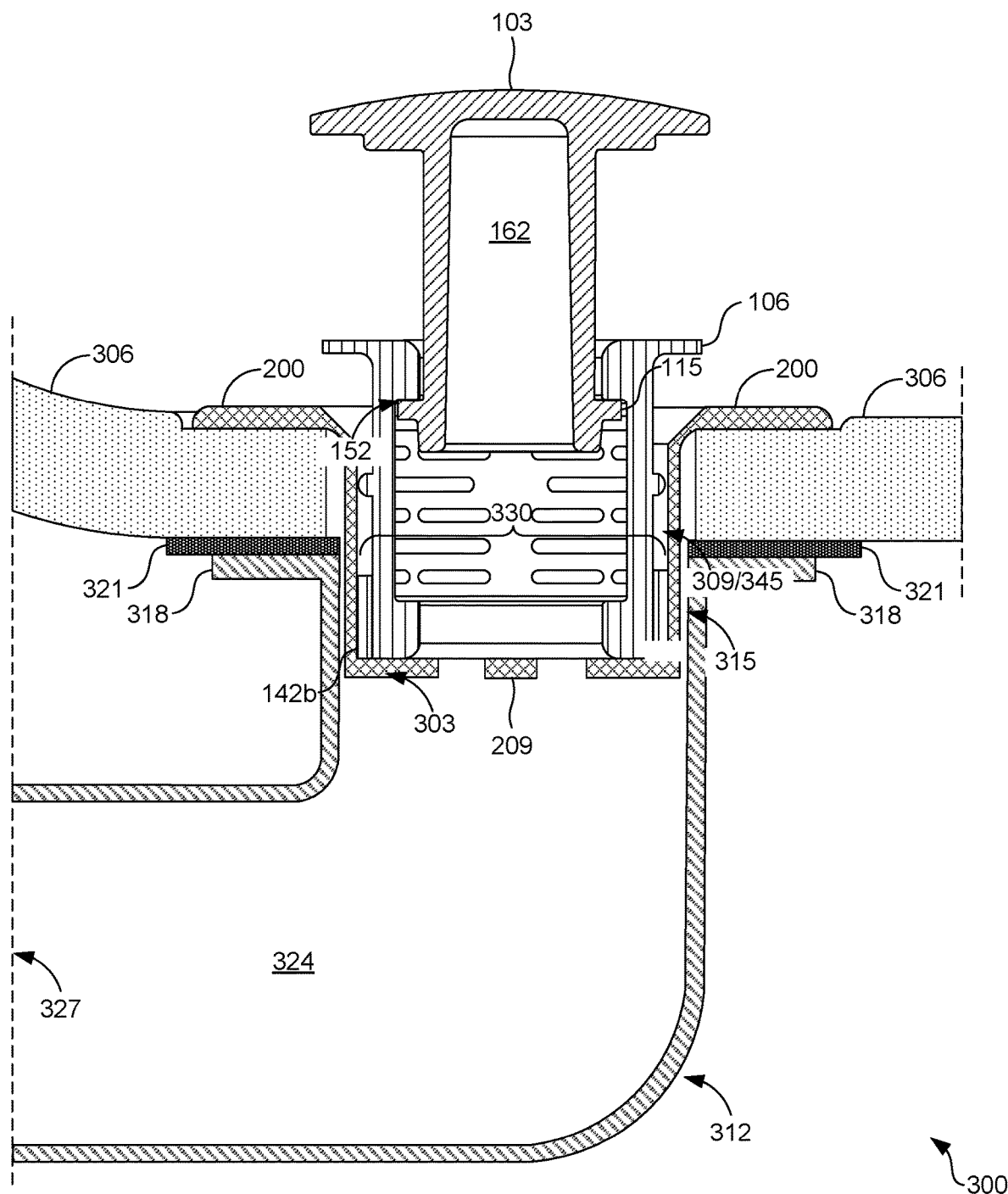

Turning now to FIGS. 21A, 21B, and 21C, cross-section views of an example of a tub assembly 300 are shown. For purposes of illustration, the pop-up assembly 103 is not shown in FIG. 21A, however, the pop-up assembly 103 is shown along with the basket assembly 106 in FIGS. 21B and 21C. The tub assembly 300 may include the drain debris straining assembly 100 installed in a tub drain flange 200, which includes a male threaded portion 303. The tub assembly 300 further includes a tub 306, a tub opening 309, a cross-wall 209, a shoe 312, a female threaded portion 315, a shoe flange 318, a shoe gasket 321, an inside open area 324, and a sewer outlet 327.

As shown in FIG. 21A, when the basket assembly 106 is installed, the second flexible rib 142b folds upwards, thereby creating an interference fit between the basket assembly 106 and the tub drain flange 200. In other words, the flexible rib 142b compresses against an internal diameter or the inner walls of the tub drain flange 200 to form a seal between the basket assembly 106 and the tub drain flange 200.

Figure 21D:
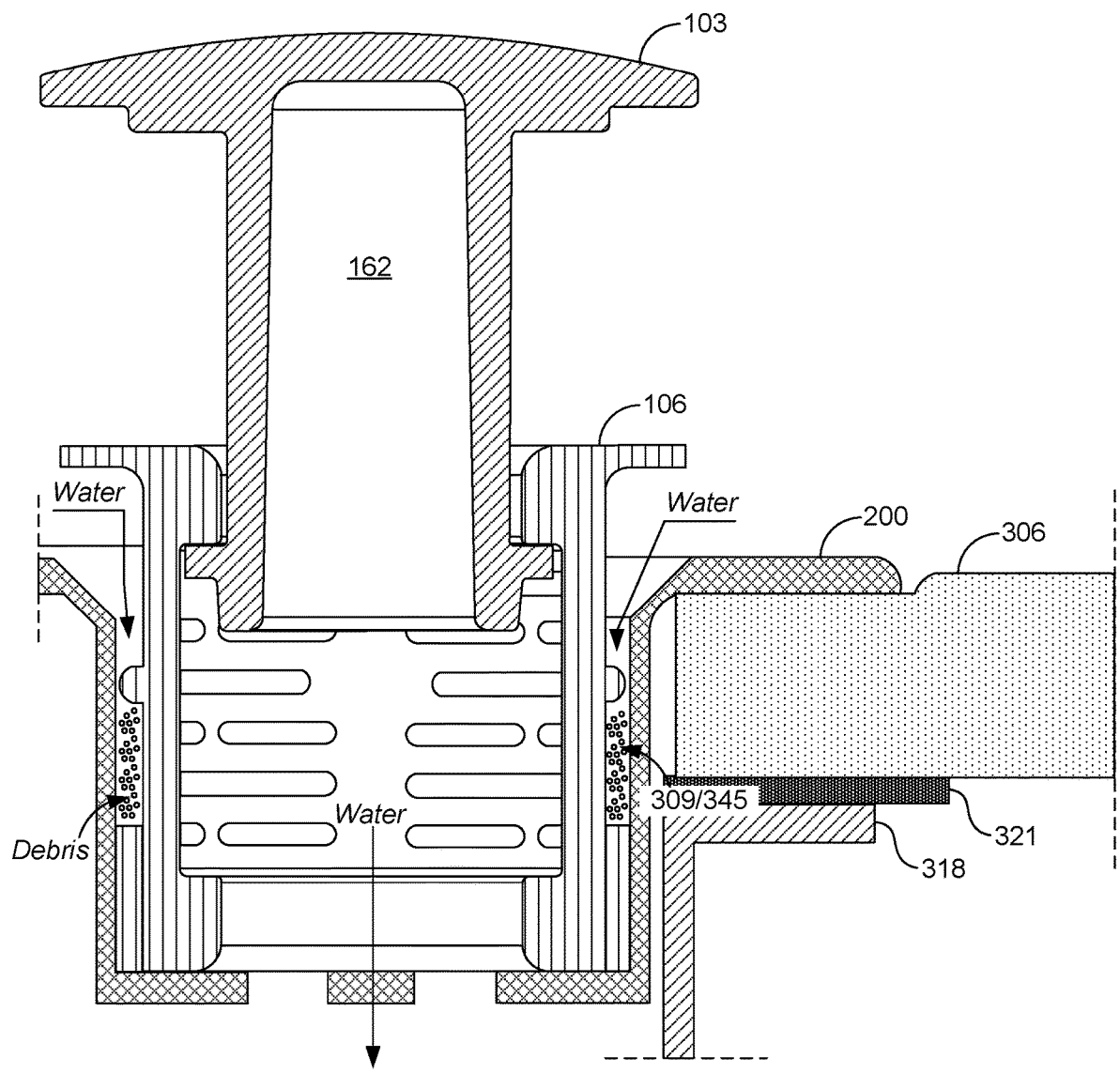

FIGS. 21B, 21C, and 21D further include the pop-up assembly 103 installed in the basket assembly 106. The pop-up head 109 acts as a sealing surface for the pop-up assembly 103 while the lower one of the flexible ribs 142b acts as a sealing surface for the basket assembly 106. The tub drain flange 200 is mounted into the tub opening 309 of the tub 306. Typically the tub drain flange 200 is threadably connected with a male threaded portion 303. Specifically, a male threaded portion 303 of the tub drain flange 200 is threaded into a female threaded portion 315 of the shoe 312, where the inside open area 324 of the shoe 312 transfers water from the tub 306 into the sewer outlet 327 and into the sanitary sewer. The shoe 312 may include a shoe flange 318 as well as a shoe gasket 321 that seals the bottom portion of the tub 306 as the male threaded portion 303 is tightened into the female threaded portion 315 of the shoe 312.

The tub drain flange 200 traditionally comes with a factory stopper 203 that is specifically designed to stop water in the tub drain flange 200. However, as the factory stopper 203 is not efficient as capturing hair and other debris, the factory stopper 203 may be removed and the drain debris straining assembly 100 may be installed in its place. For instance, in FIGS. 21A, 21B, and 21C, the tub assembly 300 is shown including the drain debris straining assembly 100 installed in the tub drain flange 200.

The basket assembly 106 of the drain debris straining assembly 100, through its flexible rib 142b, compresses against the inside diameter 330 of the tub drain flange 200. Thus, the flexible rib 142b of the basket assembly 106 acts as a basket sealing surface that prevents water from draining out of the tub 306 when the pop-up assembly 103 is in the lower position, as shown in FIG. 21B. The interference ridge 115 of the pop-up assembly 103 contacts the lower ridges 155 of the basket to form a basket sealing surface that holds water or other fluids in the tub 306 or other fluid basin. The cross-wall 209 that contacts the bottom portion of the basket assembly 106 is a partial wall that is typically in the shape of a plus sign, as shown in FIG. 20, that allows water to pass through the opening of the shoe 312 and the inside open area 324, through the sewer outlet 327 and into a sewage system (e.g., sewer or septic tank).

The compression of the flexible rib 142b against the internal diameter of the drain flange forms a reservoir 345, where water and other fluids are drained into the reservoir 345 from the tub 306. Water is then filtered into the reservoir 345 into an interior of the basket assembly 106 through the openings 139. However, debris is retained outside of the basket assembly 106, for instance, in the reservoir 345 or on an outside surface of the basket body 130. As may be appreciated, when hair or other debris is collected by the drain debris straining assembly 100, the consumer may then remove the pop-up assembly 103 from the basket body 130, optionally remove the basket body 130 from the tub drain flange 200, and remove the debris from the reservoir 345.

With reference to FIG. 21C, the pop-up 710 is shown pulled upwards to the open position, which allows water in the tub 306 to travel through the tub opening 309 and enter the basket assembly 106 through the openings 139. In other words, the openings 139 act as an inlet for water received by way of the tub opening 309. Any hair or other debris will coalesce or build up at or near the openings 139 of the basket assembly 106, for instance, at the tub opening 309. As the filtered water enters the basket assembly 106 through the openings 139, the water drains through the bottom aperture 136 of the basket assembly 106 into the shoe 312, eventually draining through the inside open area 324 and the sewer outlet 327 and into a sewage system. The flow of the water and the collection of the debris in the reservoir 345 is illustrated in FIG. 21D.

While various embodiments discussed herein describe example implementations of the drain debris straining assembly 100 with respect to bath tubs and tub drains, the embodiments described herein are not limited to tub drains as the drain debris straining assembly 100 may also be implemented in bathroom, lavatory, and kitchen sink drains.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A drain debris straining apparatus, comprising:
  a basket assembly configured to be positioned at least partially in a drain flange, comprising:
    a basket body surrounding a hollow core, the basket body comprising a plurality of openings configured to filter fluid to entrap debris;
    a first flexible rib positioned at a top end of the basket body having a diameter greater than a diameter of the basket body; and
    a second flexible rib positioned at a bottom end of the basket body having a diameter greater than the diameter of the basket body, the second flexible rib being configured to fold upwards when the basket assembly is positioned in the drain flange and compress against an internal diameter of the drain flange to form a seal between the basket assembly and the drain flange; and
  a pop-up assembly, comprising:
    an interference ridge positioned at a bottom of the pop-up assembly, the interference ridge comprising a plurality of projections that project radially from a surface of the interference ridge that contact and form an interference fit with at least one inner wall of the basket assembly to retain a vertical position of the pop-up assembly relative to the basket assembly; and
    a pop-up base positioned below the interference ridge having a diameter less than a diameter of the interference ridge;
    wherein the pop-up assembly is configured to form a water-tight seal with a basin when the pop-up assembly is moved from an open position to a closed position.

2. The drain debris straining apparatus of claim 1, wherein the plurality of openings extend horizontally along the basket body.

3. The drain debris straining apparatus of claim 1, wherein the basket body comprises a top aperture and a bottom aperture.

4. The drain debris straining apparatus of claim 3, wherein the basket body is substantially symmetrical and is formed of a flexible material that permits a stretching of the top aperture to facilitate placement of at least a portion of the pop-up assembly into the hollow core of the basket body.

5. The drain debris straining apparatus of claim 1, wherein:
  the basket body comprises an upper ridge and a lower ridge configured to contact the interference ridge of the pop-up assembly and maintain the pop-up assembly in a position between the upper ridge and the lower ridge of the basket body;
  the upper ridge is sized and positioned to prevent an upwards movement of the pop-up assembly beyond a predetermined height; and
  the lower ridge is sized and positioned to prevent a downward movement of the pop-up assembly lower than a predetermined depth.

6. The drain debris straining apparatus of claim 1, wherein the pop-up assembly comprises a hollow interior configured to receive at least an upper portion of a factory post coupled to the drain flange.

7. The drain debris straining apparatus of claim 1, wherein the pop-up base is tapered downwards from a body of the pop-up assembly.

8. The drain debris straining apparatus of claim 2, wherein:
  the pop-up assembly comprising a plurality of elongated fins that extend vertically along and project radially from a body of the pop-up assembly, the elongated fins forming channels that guide water into an interior of the basket assembly; and
  the vertical position of the pop-up assembly is retained relative to the basket assembly through an interference fit, wherein the pop-up assembly comprises an interference ridge sized and positioned to contact at least one inner wall of the basket assembly and form the interference fit between the pop-up assembly and the basket assembly.

9. The drain debris straining apparatus of claim 1, wherein the basket body comprises a plurality of spacers configured to maintain a separation between the second flexible rib and the basket body when the basket assembly is installed in the drain flange.

10. The drain debris straining apparatus of claim 1, wherein the basket body comprises an annular grove located at a bottom surface of the basket body configured to provide flexibility when the second flexible rib is compressed.

11. The drain debris straining apparatus of claim 1, wherein the debris comprises hair.

12. A method, comprising:
  inserting a basket assembly into a drain flange, wherein the basket assembly comprises:
    a basket body surrounding a hollow core, the basket body comprising a plurality of openings configured to filter fluid to entrap debris;
    a first flexible rib positioned at a top end of the basket body having a diameter greater than a diameter of the basket body; and
    a second flexible rib positioned at a bottom end of the basket body having a diameter greater than the diameter of the basket body, the second flexible rib being configured to compress against an internal diameter of the drain flange and fold upwards when the basket assembly is positioned in a drain flange to form a seal between the basket assembly and the drain flange; and inserting a pop-up assembly into a top aperture of the basket assembly, wherein the pop-up assembly comprises:
- an interference ridge positioned at a bottom of the pop-up assembly, the interference ridge comprising a plurality of projections that project radially from the interference ridge that contact and form an interference fit with at least one inner wall of the basket assembly to retain a vertical position of the pop-up assembly relative to the basket assembly; and
- a pop-up base positioned below the interference ridge having a diameter less than a diameter of the interference ridge;
- wherein the pop-up assembly is configured to form a water-tight seal with a basin when the pop-up assembly is moved from an open position to a closed position; and adjusting the vertical position of the pop-up assembly relative to the basket assembly by pushing or pulling on the pop-up assembly.

13. The method of claim 12, wherein adjusting the vertical position of the pop-up assembly comprises pulling the pop-up assembly upwards until the interference ridge of the pop-up assembly contacts an upper ridge of an interior of the basket body.

14. The method of claim 12, wherein adjusting the vertical position of the pop-up assembly comprises pushing the pop-up assembly downwards until the interference ridge of the pop-up assembly contacts a lower ridge of an interior of the basket body.

15. The method of claim 12, wherein the plurality of openings extend horizontally along the basket body.

16. The method of claim 12, wherein a compression of the flexible rib against the internal diameter of the drain flange form a reservoir, wherein debris is retained outside of the basket body in the reservoir.

17. The method of claim 16, further comprising:
removing the pop-up assembly from the basket body; and
removing the debris from the reservoir.

18. The method of claim 12, wherein the pop-up assembly further comprises a pop-up head having a diameter wider than a body of the pop-up assembly, the pop-up head configured to be a sealing surface for the pop-up assembly.

19. The method of claim 18, wherein the pop-up assembly further comprises a plurality of support members that project radially from a top distal end of the body of the pop-up assembly, the plurality of support members being coupled to a bottom surface of the pop-up head.

20. The drain debris straining apparatus of claim 1, wherein the pop-up assembly further comprises:
- a pop-up head having a diameter wider than a body of the pop-up assembly, the pop-up head configured to be a sealing surface for the pop-up assembly; and
- a plurality of support members that project radially from a top distal end of the body of the pop-up assembly, the plurality of support members being coupled to a bottom surface of the pop-up head.

* * * * *